(12) United States Patent
Bryant et al.

(10) Patent No.: US 12,298,455 B2
(45) Date of Patent: May 13, 2025

(54) SYSTEM AND METHOD FOR SEISMICALLY TRIGGERED INTRUSION DETECTION

(71) Applicant: EarthSystems Technologies, Inc., Carollton, TX (US)

(72) Inventors: John Bryant, Dallas, TX (US); Frederick Hershel Savage, Austin, TX (US)

(73) Assignee: EarthSystems Technologies Operating LLC, Carrollton, TX (US)

(*) Notice: Subject to any disclaimer, the term of this patent is extended or adjusted under 35 U.S.C. 154(b) by 358 days.

(21) Appl. No.: 17/658,223

(22) Filed: Apr. 6, 2022

(65) Prior Publication Data

US 2023/0324572 A1    Oct. 12, 2023

(51) Int. Cl.
*G01V 1/00*    (2024.01)
*G01V 1/28*    (2006.01)
*G01V 1/30*    (2006.01)

(52) U.S. Cl.
CPC .............. *G01V 1/003* (2013.01); *G01V 1/288* (2013.01); *G01V 1/303* (2013.01)

(58) Field of Classification Search
CPC ......... G01V 1/003; G01V 1/288; G01V 1/303
See application file for complete search history.

(56) References Cited

U.S. PATENT DOCUMENTS

| | | |
|---|---|---|
| RE32,468 E | 8/1987 | Le Nay et al. |
| 6,380,889 B1 | 4/2002 | Herrmann et al. |
| 6,532,190 B2 | 3/2003 | Bachrach |
| 6,859,831 B1 | 2/2005 | Gelvin et al. |
| 7,080,544 B2 | 7/2006 | Stepanik et al. |
| 7,122,783 B1 | 10/2006 | Pastore et al. |
| 7,386,402 B2 | 6/2008 | Bryant |
| 7,425,902 B2 | 9/2008 | Fedora et al. |

(Continued)

FOREIGN PATENT DOCUMENTS

| | | |
|---|---|---|
| CN | 104167073 B | 8/2016 |
| WO | 9633478 A1 | 10/1996 |

(Continued)

OTHER PUBLICATIONS

Werner-Allen, Geoffrey, et al. "Monitoring volcanic eruptions with a wireless sensor network." Proceedings of the Second European Workshop on Wireless Sensor Networks, 2005. IEEE, 2005.

(Continued)

*Primary Examiner* — Manuel A Rivera Vargas
(74) *Attorney, Agent, or Firm* — Schultz & Associates, P.C.

(57) ABSTRACT

The invention disclosed provides a network of master controller and node arrays which all communicate with a system server, a client device and an administrator device. Each of the master controller and node arrays is equipped with an ERT system, and various seismic sensors to monitor a geographic perimeter for surface and sub-surface trigger events. Upon detection of a trigger event, each of the master controller and node arrays executes a sensor monitoring routine to determine the approximate path of travel, velocity, acceleration of the trigger event. The master controller and node arrays further conduct an ERT survey to determine the presence of anomalies which may indicate sub-surface activity related to the trigger event.

30 Claims, 24 Drawing Sheets

(56) References Cited

U.S. PATENT DOCUMENTS

| | | |
|---|---|---|
| 7,786,885 B2 | 8/2010 | Payton |
| 7,788,049 B2 | 8/2010 | Bryant et al. |
| 7,813,883 B2 | 10/2010 | Bryant |
| 7,864,037 B2 | 1/2011 | Miller |
| 7,869,444 B2 | 1/2011 | Menard et al. |
| 7,957,222 B2 | 6/2011 | Souders et al. |
| 8,019,547 B2 | 9/2011 | Bryant |
| 8,031,555 B2 | 10/2011 | Schuster |
| 8,217,803 B2 | 7/2012 | El-hamamsy et al. |
| 8,321,160 B2 | 11/2012 | Bryant et al. |
| 8,510,076 B2 | 8/2013 | Green et al. |
| 8,520,587 B2 | 8/2013 | Menard et al. |
| 8,615,476 B2 | 12/2013 | Berger et al. |
| 8,674,842 B2 | 3/2014 | Zishaan |
| 8,804,463 B2 | 8/2014 | Krumhansl et al. |
| 9,031,791 B2 | 5/2015 | Nedilko et al. |
| 9,234,973 B2 | 1/2016 | Scarlatti et al. |
| 9,239,396 B2 | 1/2016 | Thompson et al. |
| 9,557,413 B2 | 1/2017 | Kozma et al. |
| 9,578,398 B2 | 2/2017 | Svoen et al. |
| 9,721,456 B2 | 8/2017 | Thurlow et al. |
| 9,886,833 B2 | 2/2018 | Noland et al. |
| 9,995,838 B2 | 6/2018 | Labrecque |
| 10,120,088 B2 | 11/2018 | Jurok et al. |
| 10,276,013 B2 | 4/2019 | Undy |
| 2008/0221797 A1* | 9/2008 | Bryant ............... G01V 1/22 324/354 |
| 2008/0255431 A1 | 10/2008 | Erad et al. |
| 2012/0053840 A1 | 3/2012 | Knutsen |
| 2012/0134237 A1 | 5/2012 | Esteban-Campillo et al. |
| 2014/0056103 A1 | 2/2014 | Virgin et al. |
| 2014/0236487 A1 | 8/2014 | Kimman |
| 2014/0307523 A1 | 10/2014 | Elder et al. |
| 2014/0307525 A1 | 10/2014 | Postel et al. |
| 2015/0109883 A1 | 4/2015 | Vangasse et al. |
| 2016/0097870 A1* | 4/2016 | Routh ............... G01V 1/282 703/2 |
| 2019/0383958 A1 | 12/2019 | Jamali et al. |
| 2021/0255349 A1* | 8/2021 | Zhou ............... G01V 1/282 |

FOREIGN PATENT DOCUMENTS

| | | |
|---|---|---|
| WO | 0126327 A2 | 7/2002 |
| WO | 2005006273 A2 | 3/2005 |
| WO | 2010009165 | 3/2010 |
| WO | 2011123893 | 10/2011 |
| WO | 2019132979 A1 | 7/2019 |
| WO | 2021048629 A2 | 3/2021 |

OTHER PUBLICATIONS

Pottie, Gregory J., and William J. Kaiser, "Wireless integrated network sensors."Communications of the ACM 43.5 (2000): 51-58.

Peng, Chaoyong, et al. "Performance evaluation of a dense MEMS-based seismic sensor array deployed in the Sichuan-Yunnan border region for earthquake early warning." Micromachines 10.11 (2019): 735.

Tuna, Gurkan, V. Cagri Gungor, and Kayhan Gulez, "Wireless sensor networks for smart grid applications: a case study on link reliability and node lifetime evaluations in power distribution systems." International Journal of Distributed Sensor Networks 9.2 (2013): 796248.

Intanagonwiwat, Chalermek, Ramesh Govindan, and Deborah Estrin, "Directed diffusion: A scalable and robust communication paradigm for sensor networks."Proceedings of the 6th annual international conference on mobile computing and networking. 2000.

Lee, Winnie Louis, "Flexible-schedule-based tdma protocols for supporting fault-tolerance, on-demand tdma slot transfer, and peer-to-peer communication in wireless sensor networks." University of Western Australia, 2008.

Harrington, Ryan F. "Unattended ground sensors for Expeditionary Force 21 intelligence collections." Naval Postgraduate School Monterey CA, 2015.

Palm, Bradley C., and Ryan P. Richter "Mobile situational awareness tool: Unattended ground sensor-based remote surveillance system." Naval Postgraduate School Monterey CA, 2014.

Mn, Zhiyuan, Yan Zhou, and Yongxin Li. "Seismic exploration wireless sensor system based on wi-fi and LTE." Sensors 20.4 (2020): 1018.

Mahamuni, Chaitanya Vijaykumar. "A military surveillance system based on wireless sensor networks with extended coverage life." 2016 International conference on global trends in signal processing, information computing and communication (ICGTSPICC). IEEE, 2016.

* cited by examiner

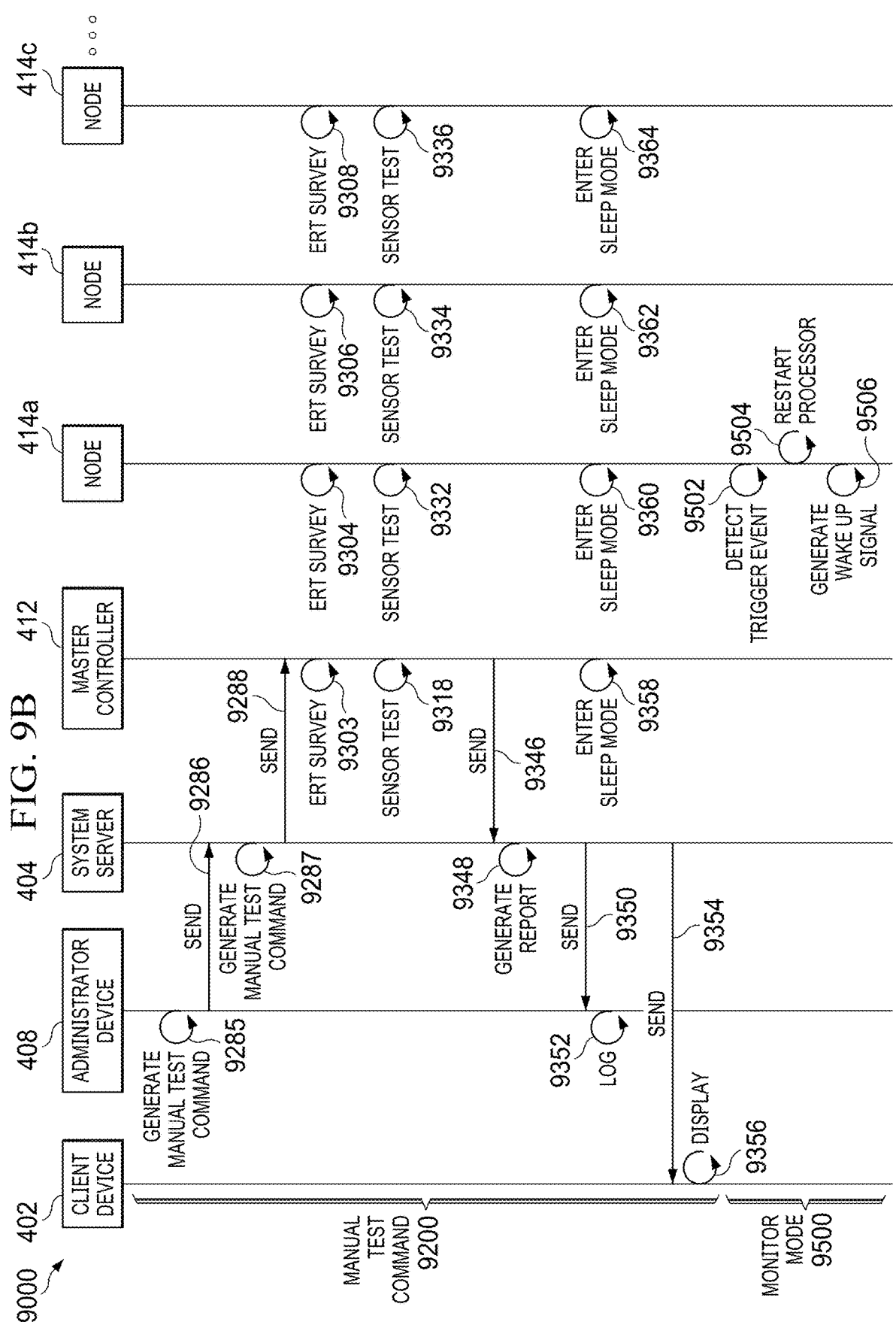

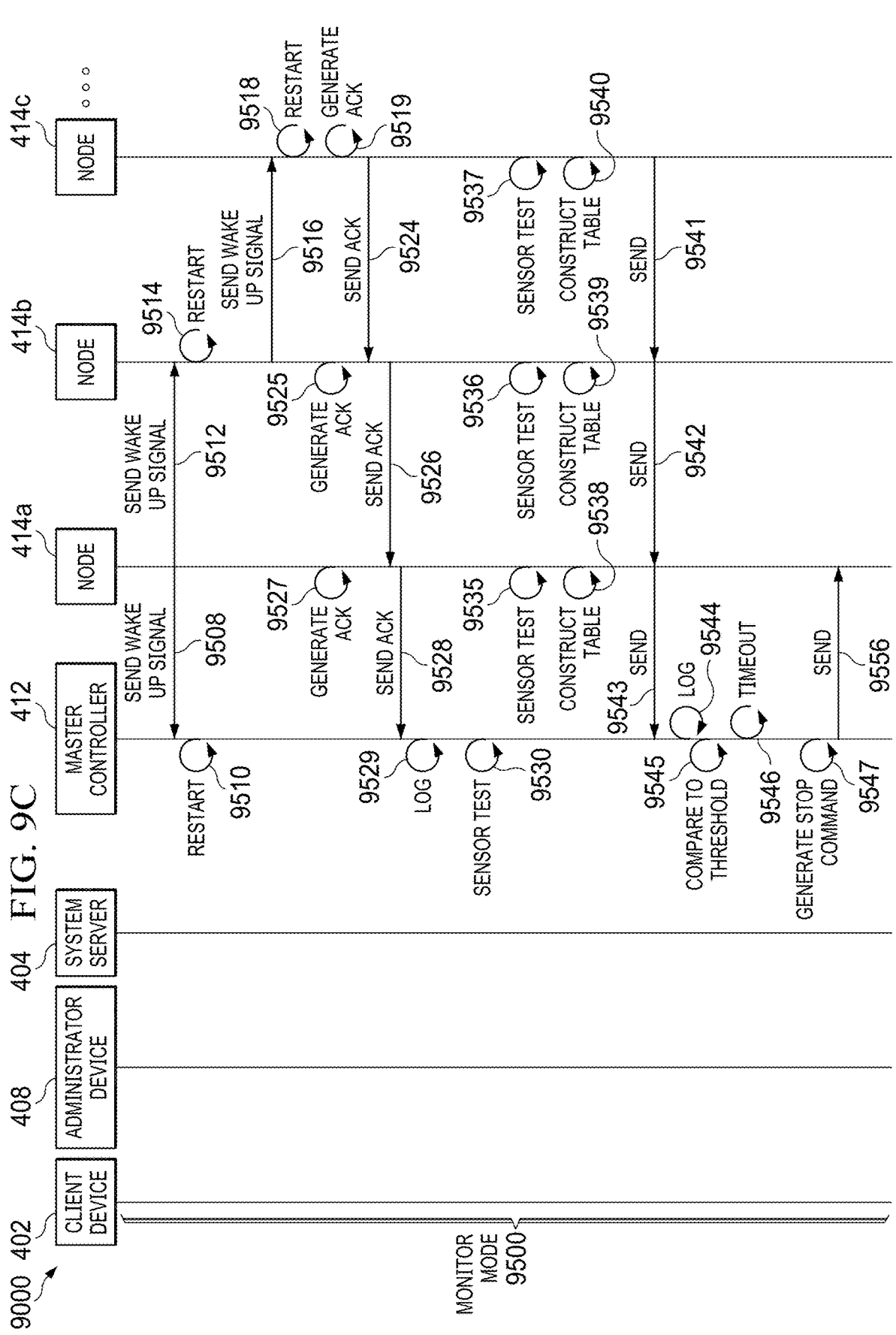

SYSTEM AND METHOD FOR SEISMICALLY TRIGGERED INTRUSION DETECTION

FIELD OF THE INVENTION

The present invention relates to the use of electrical resistivity tomography (ERT) systems for detecting subsurface anomalies and sonic, magnetic and motion detection for perimeter monitoring and intruder detection.

BACKGROUND OF THE INVENTION

Protecting perimeters of secure areas, such as borders, prisons, and other governmental or private facilities, from unwanted intrusion requires advanced intrusion detection. Traditionally, intrusion detection relies on visual means, such as security guards, video monitoring systems, and infrared. However, relying on visual means alone is ineffective because it requires constant monitoring of each potential point of ingress, which is impractical because of the associated expense and labor required. Another problem with traditional visual monitoring systems is that they can only recognize surface intrusion, leaving any subsurface intrusion unidentified.

Many automated systems for motion detection and perimeter monitoring have been developed.

For example, U.S. Pat. No. 3,806,908 to Bound, et al. discloses a system for detecting a surface perimeter breach using subsurface sensors, such as piezoelectric transducers. Referring then to FIG. 1, a series of subsurface sensors 22 are installed around perimeter 12 of a secure facility. Subsurface sensors 22 detect pressure changes in the soil caused by surface movement, such as from intruder 28. However, the sensors only detect activity in narrow corridor 33. As a result, any movement outside of narrow corridor 33 will remain undetected. Furthermore, Bound is unable to accurately identify what is causing the pressure change or its direction of travel.

As another example, U.S. Pat. No. 7,616,115 to Horak, et al. discloses a system for detecting surface perimeter breach. Referring then to FIG. 2, sensors 105 are fixed on the ground surface by stakes 150. Processor 130 correlates signals received from geophone 110 and acoustic transducer 120 and determines if the signals match typical patterns seen in a normal human gait. If so, then an alert is transmitted. However, Horak is visible to a surface level intruder. Additionally, Horak cannot identify non-human or subsurface perimeter intrusion.

As yet another example, U.S. Pat. No. 8,659,424 to Krumhansl, et al. discloses a system for detecting subsurface perimeter intrusion using sets of seismic sensors. Referring then to FIG. 3, a first set of sensors, sensors 110U, 112U, 114U, and 116U are buried close to the surface and a second set of sensors, sensors 110L, 112L, 114L, and 116L are buried at a depth greater than the first set. The system uses the differences between signals received at the first set of sensors versus the second set of sensors, such as start time or amplitude, to determine if an event is a subsurface event. If the event is a subsurface activity, then the system determines if the signals received are similar those traditionally associated with human intrusion detection, such as slow repetitive activity associated with a tunnel. If so, an alert is issued. However, Krumhansl does not monitor surface activity and does not adequately differentiate and identify subsurface activity. Krumhansl also fails to disclose identifying a direction of travel, the velocity or the acceleration of a trigger event. Still further, Krumhansl fails to provide a way to image subsurface trigger events or analyze their cause.

In many situations, subsurface monitoring is also needed beyond perimeter intrusion detection. For instance, to monitor natural erosion, or leaks. Preventative or curative activity could be undertaken if subsurface changes could be timely detected. For example, timely leak detection might enable early repair of leaks that otherwise might be more costly if left unchecked. Likewise, timely detection of subsurface tunnels might allow reduction in security breaches, property loss, and potential injury to security personnel.

Many systems exist for imaging subsurface structures using electrical resistivity measurements made by electrodes impressed in the ground, such as ERT.

One such system is described in U.S. Pat. No. 8,019,547 to Bryant. The invention described in the '547 Patent employs reconfigurable nodes located at each electrode in the array operated by a master controller. The system of the '547 Patent must be manually triggered to begin an ERT survey. U.S. Pat. No. 8,019,547 is incorporated herein by reference, for all purposes.

U.S. Pat. Nos. 8,321,160; 7,788,049; 7,813,883 and 7,386,402 to Bryant similarly disclose the use of a reconfigurable array of electrodes inserted into the ground. These systems also must be manually triggered to actuate an ERT survey. U.S. Pat. Nos. 8,321,160; 7,788,049; 7,813,883 and 7,386,402 are incorporated herein by reference, for all purposes.

U.S. patent application Ser. Nos. 17/302,050; 16/948,059; 16/948,061 and 16/948,062 to Bryant disclose the use of nodes comprised of a hermetically sealed controller housing with controller boards interchangeably connected to electrodes inserted into the ground. The trigger mechanisms of these inventions are also manually operated. U.S. patent application Ser. Nos. 17/302,050; 16/948,059; 16/948,061 and 16/948,062 are incorporated herein by reference, for all purposes.

However, none of the systems in the prior art adequately couple surface monitoring with subsurface monitoring and analysis. Thus, there remains a need in the art for a permanently installed intrusion detection system to automatically and continuously monitor surface and subsurface conditions that change over time. In the same way, there exists a need for a seismic system that can monitor both above ground and subsurface events for perimeter intrusion detection over an extended period of time and report important events, such as trigger event direction of travel, velocity and acceleration.

BRIEF DESCRIPTION OF THE DRAWINGS

In the detailed description of the preferred embodiments presented below, reference is made to the accompanying drawings.

FIGS. 9A, 9B, and 9C depict a preferred method of conducting a seismically activated ERT survey.

SUMMARY OF THE INVENTION

The invention disclosed provides a network of master controller and node arrays which all communicate with a system server, a client device and an administrator device. Each of the master controller and node arrays is equipped with an ERT system, and various sensors to monitor a geographic perimeter for surface and sub-surface trigger events. Upon detection of a trigger event, each of the master controller and node arrays executes a sensor monitoring routine to determine the approximate path of travel, velocity, acceleration of the above ground triggered event. The master controller and node arrays further conduct an ERT survey to determine the presence of anomalies which may indicate sub-surface activity related to the trigger event.

Reports are generated and wirelessly transmitted to the system server for analysis and to the client device and administrator device for viewing and interpretation.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness. Unless, otherwise specified, all tolerances are ±20% of the specified values.

Figure 1:
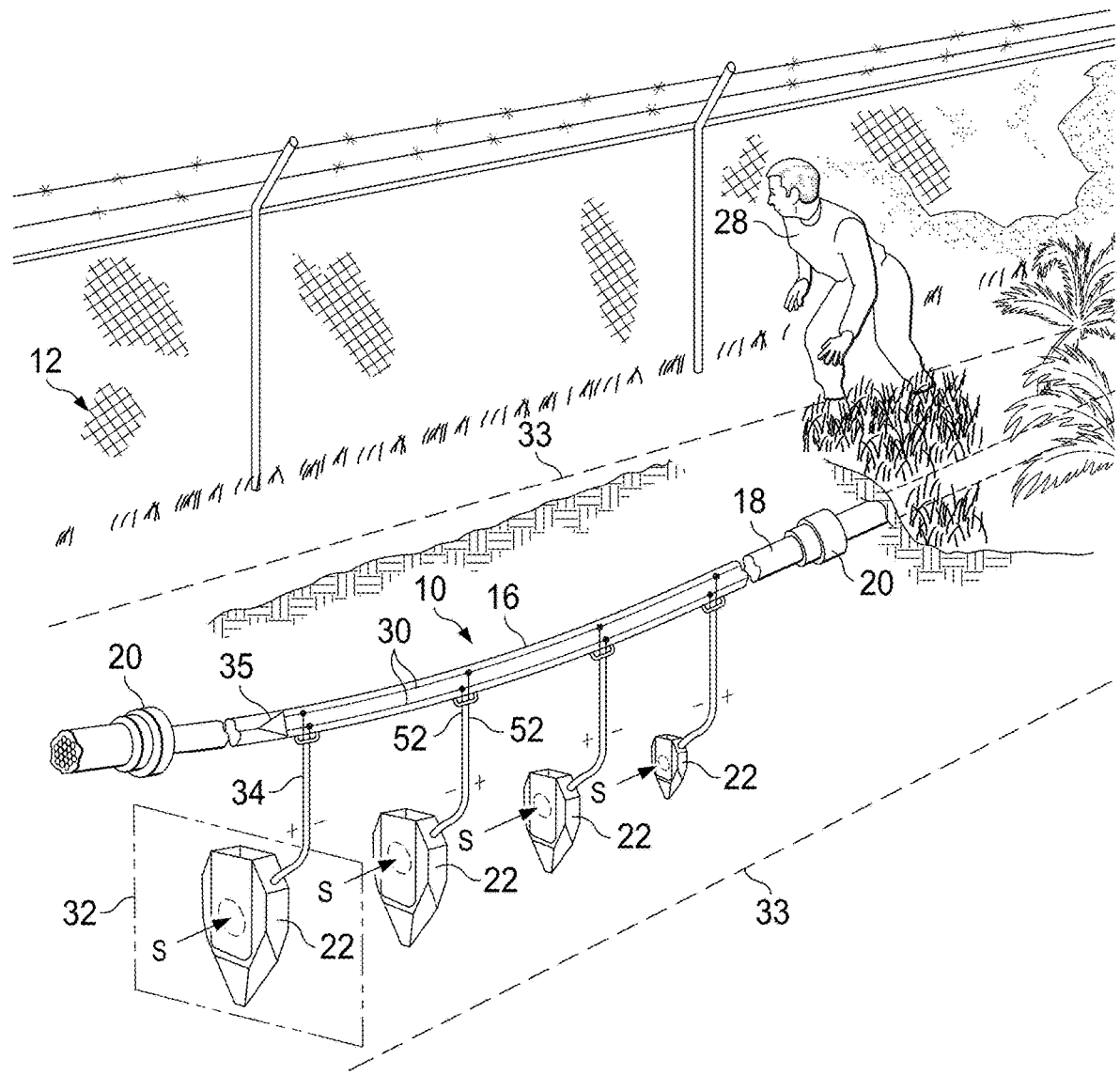
FIG. 1 is a schematic diagram of a prior art perimeter intrusion detection system.
Figure 2:
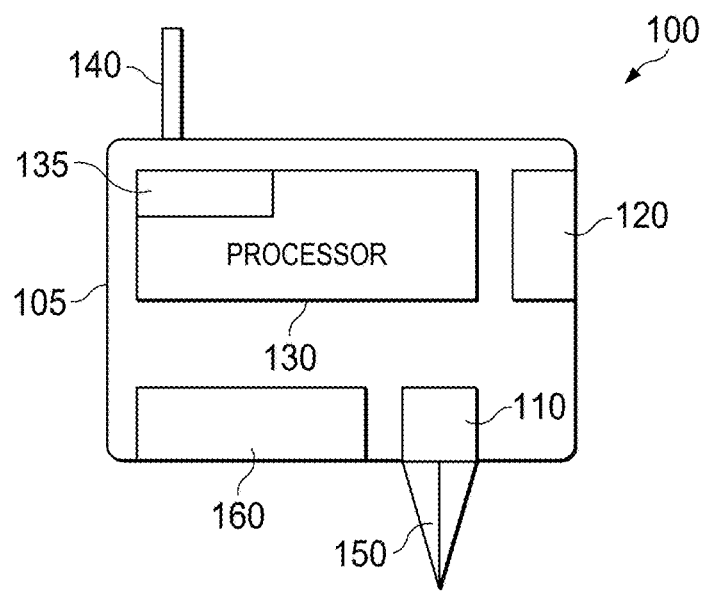
FIG. 2 is a schematic diagram of a prior art sensor for detecting perimeter intrusion.
Figure 3:
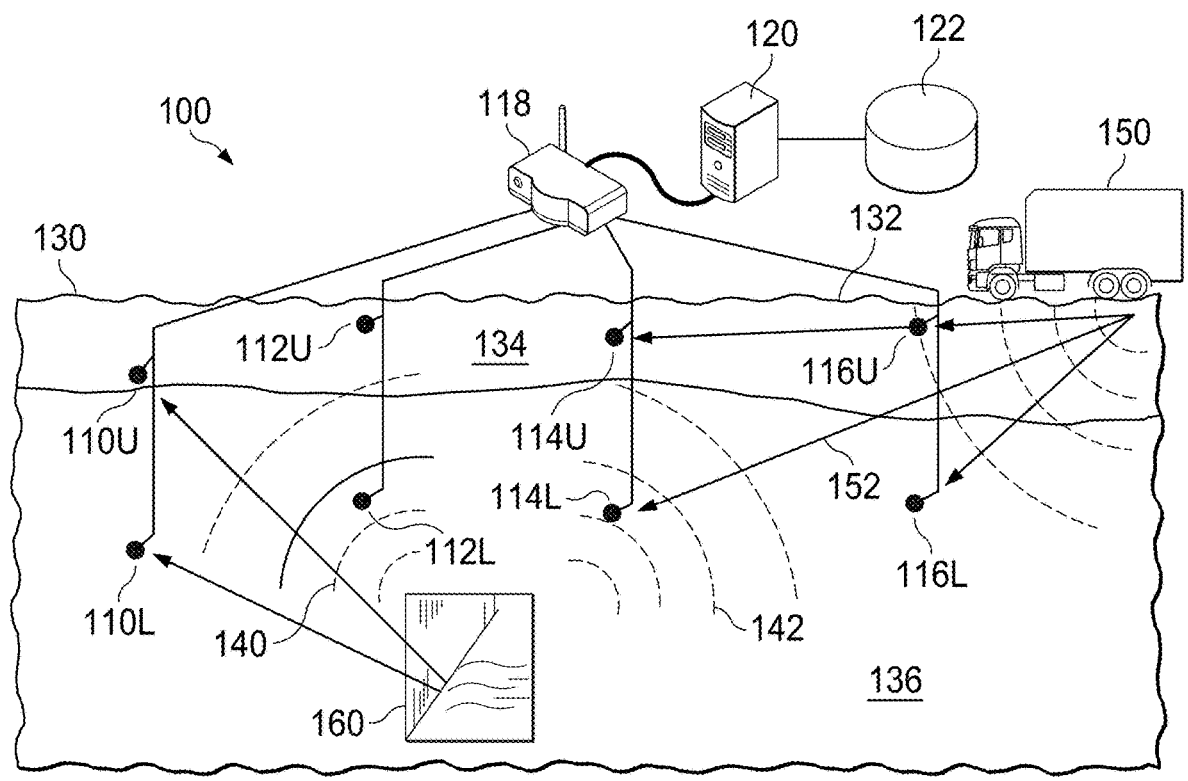
FIG. 3 is a schematic diagram of a prior art subsurface intrusion detection system.
Figure 4:
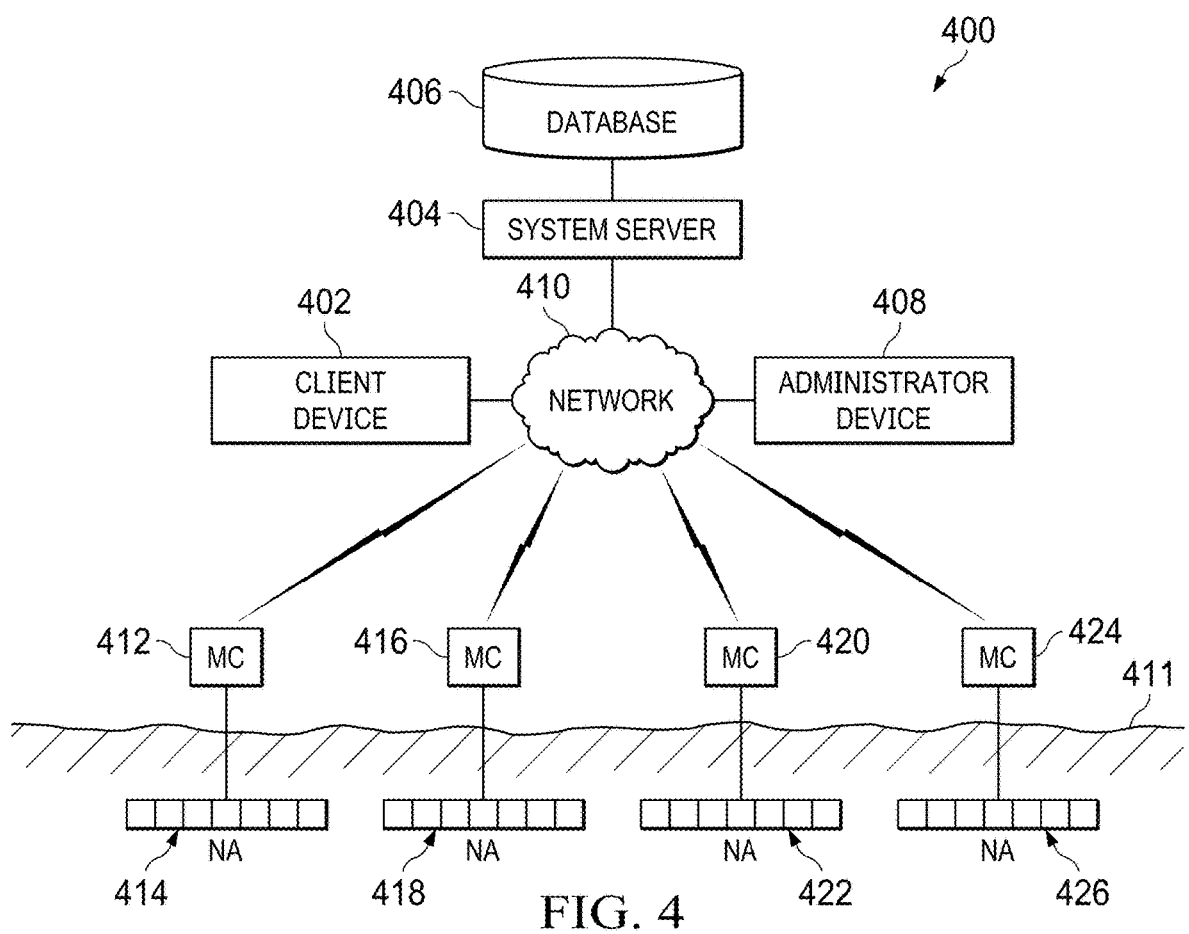
FIG. 4 is a network diagram of a preferred embodiment of a seismically triggered ERT intrusion detection system.

Referring then to FIG. 4, a preferred embodiment of a seismically triggered intrusion detection system 400 will be further described. System 400 is comprised of system server 404 connected to database 406. System server 404 is further comprised of network interfaces, processors, memories, network interfaces, and user input and output devices sufficient to enable operation with database 406 and to further perform the communications and functions required of the invention. Database 406, preferably is an SQL database program with memory sufficient to respond to requests for information from server 404. System server 404 is operatively connected to network 410. Network 410 is preferably a wide area network such as the internet.

Network 410 is further connected to client device 402 and administrator device 408. Both client device 402 and administrator device 408 further comprise network interfaces, processors, memories and user input and output devices sufficient to enable the communications and functions required for the invention. The network enables rapid data communication between client device 402, system server 404, and administrator device 408, as will be further described.

Network 410 is further connected to master controllers 412, 416, 420 and 424. Preferably network 410 is connected to the master controllers through wireless data connections.

Master controllers 412, 416, 420 and 424 are operatively connected to network arrays 414, 418, 422 and 426, respectively. Each of the network arrays is preferably permanently installed beneath ground surface 411, as will be further described.

Figure 5:
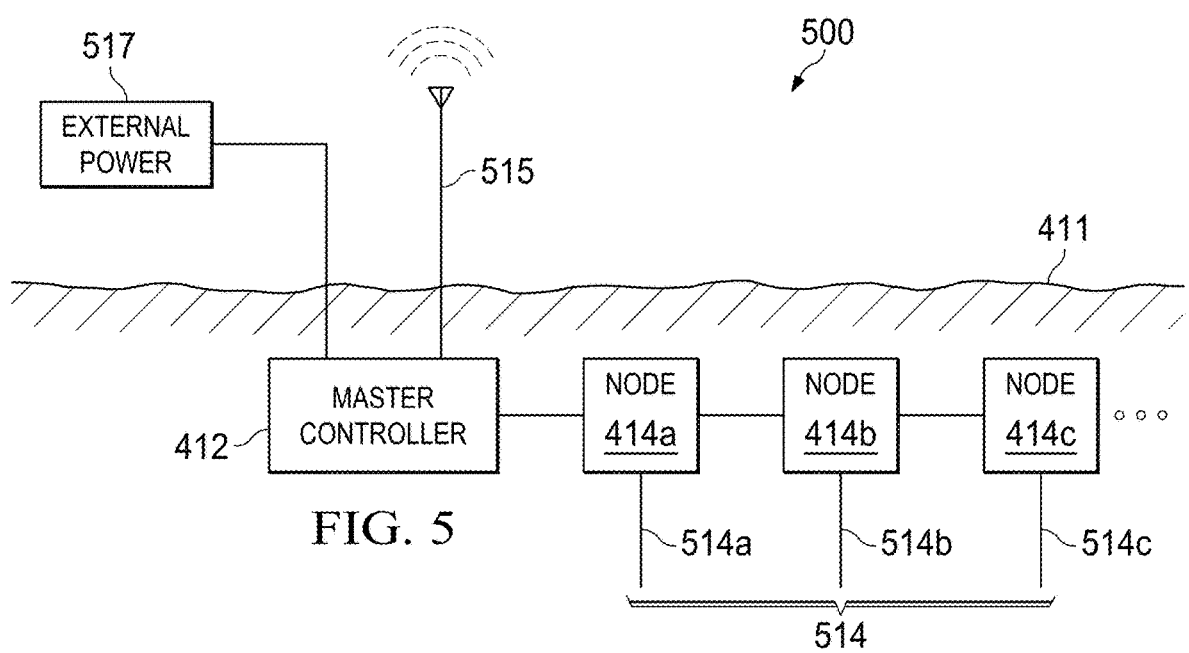
FIG. 5 is a network diagram of a preferred master controller and node array.

Referring then to FIG. 5, a preferred embodiment of a master controller and network array will be further described. Master controller 412 is operatively connected to nodes 414a, 414b, and 414c arranged in a liner array. Nodes 414a, 414b, and 414c are mechanically and electrically connected to downwardly disposed electrodes 514a, 514b, and 514c, respectively. Node array 514 can assume many topologies, as will be further described.

Master controller 412 communicates to the network through upwardly disposed antenna 515. Master controller 412 further, optionally is connected to external power source 517.

In this embodiment, both master controller 412, and node array 514 are permanently installed beneath ground surface 411.

The number of nodes used in the array may vary depending on the size of the geographic region being surveyed. In a preferred embodiment, the master controller and node array are connected in a hardwired local area network, such as that described in U.S. patent application Ser. Nos. 16/948,059 and 16/948,061 to Bryant, incorporated herein by reference for all purposes.

Figure 6:
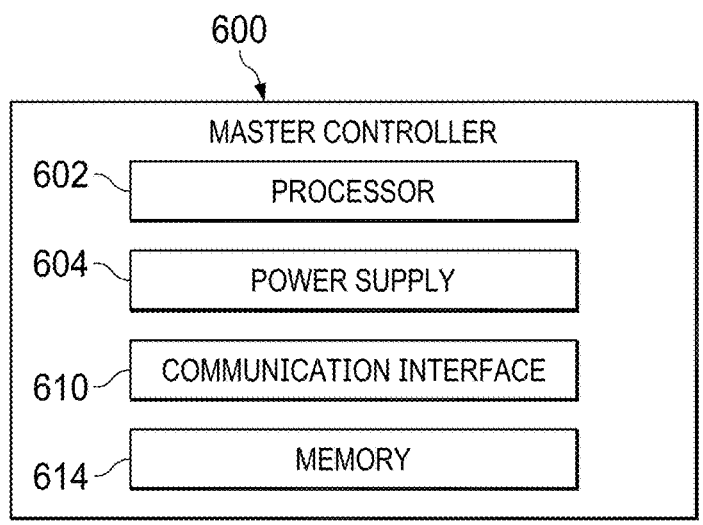
FIG. 6 is a preferred embodiment of a master controller in a seismically triggered ERT intrusion detection system.

Referring then to FIG. 6, a preferred embodiment of the function components of exemplary master controller 600 will be described. Master controller 600 includes processor 602 operatively connected to memory 614. Memory 614 stores survey data and a set of instructions for operation of the device. Processor 602 is further connected to communication interface 610. Communication interface 610 includes a hardwired local area connection, and a wireless transceiver configured to communicate with a wide area network and a node array, as previously described. Master controller 600 is further comprised of power supply 604. The power supply provides the current for conducting the ERT survey, operating the master controller and the node array. In a preferred embodiment, the master controller is configured as disclosed in U.S. patent application Ser. Nos. 16/948,059 and 16/948,061 to Bryant, which are incorporated herein by reference for all purposes, although other configurations are possible.

Figure 7:
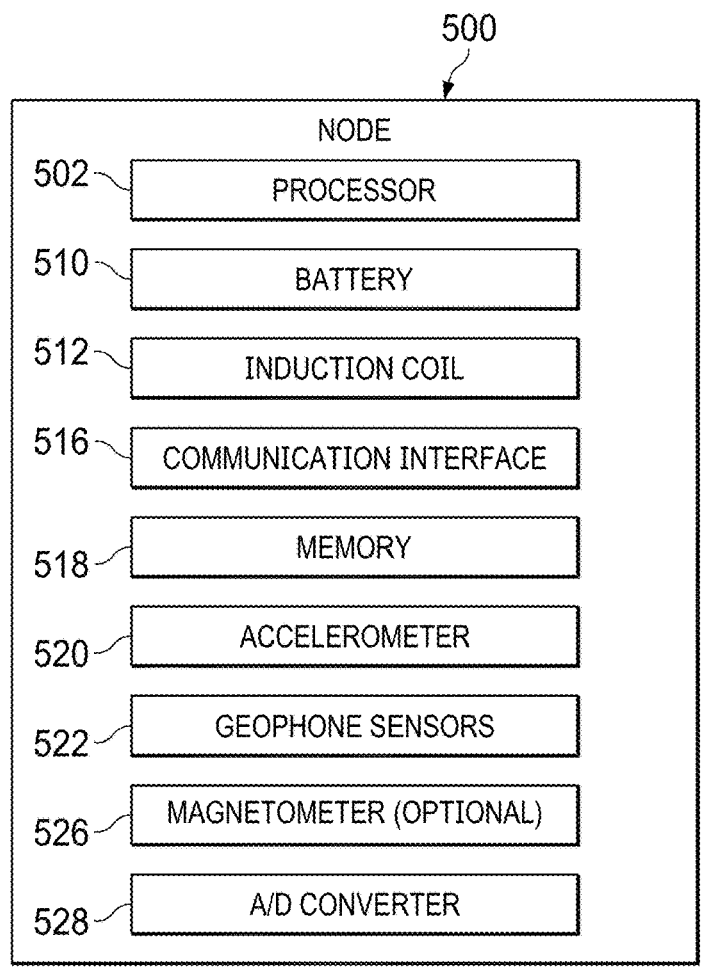
FIG. 7 is a preferred embodiment of a node in a seismically triggered ERT intrusion detection system.

Referring then to FIG. 7, a preferred embodiment of the functional components of exemplary node 500 will be described. Node 500 is comprised of processor 502 operatively connected to memory 518. Memory 518 stores survey data, and a set of instructions for operation of the processor.

The processor is operatively connected to all other components of the node and coordinates all functions of the device.

Node 500 is further comprised of battery 510 which provides internal power to all components of the device. In a preferred embodiment, the battery may be recharged wirelessly using induction coil 512.

Processor 502 is further connected to communication interface 516. In a preferred embodiment, communication interface includes a transceiver configured for local area connectivity through a hardwired connection with other nodes in the array and the master controller. In a preferred embodiment, each node is configured as disclosed in U.S. patent application Ser. Nos. 16/948,059 and 16/948,061 to Bryant, which is incorporated herein by reference for all purposes, although other configurations are possible.

Processor 502 is further operatively connected to accelerometer 520, geophone sensors 522, and magnetometer 526. In a preferred embodiment, a triple axis MEMS accelerometer is recommended, such as ADXL335 from Analog Devices, Inc. of Wilmington, Massachusetts. A geophone sensor with low distortion is recommended, such as SM-24 from Ion Geo of Houston, Texas. A triple axis magnetometer capable of sensing small and large fields is recommended, such as MLX90393 from SparkFun Electronics of Niwot, Colorado. Of course, other suitable components may be used. Each of the sensors communicates with processor 502 through analog to digital converter 528. The analog to digital converter is used to convert the analog signals from the sensors into a form suitable for storage and analysis, as will be further described.

Referring to the FIGS. 8A, 8B, 8C, 8D, and 8E, various exemplary node array topologies will be further described. Each of the node arrays may be configured in one of several topologies. Preferably, one of a dipole-dipole, pole-dipole, Wenner and Schlumberger topologies is employed. Other topologies are possible, such as pole-pole, square, bipole-bipole, equatorial, gradient and azimuthal, which can be accommodated in other embodiments.

Figure 8A:
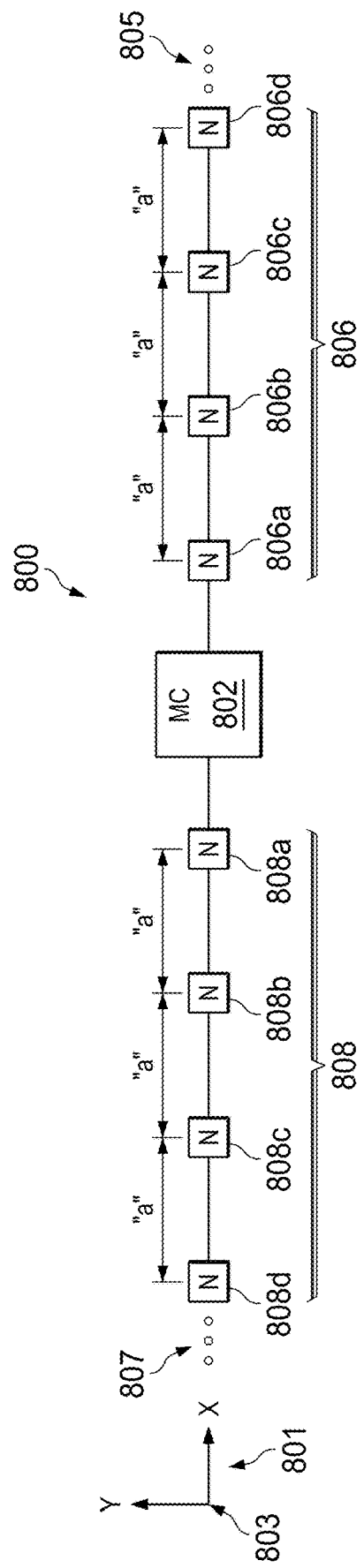
FIGS. 8A, 8B, 8C, 8D and 8E are network diagrams of various preferred embodiments of master controller and node array arrangements.

FIG. 8A is a plan view indicating linearly disposed node array 800 along the x-axis in a "dual direction" topology. Master controller 802 is operatively connected to linear node array 806 and linear node array 808, and operates both arrays in tandem.

Node array 806 is further comprised of nodes 806a, 806b, 806c and 806d. The nodes have an equal interstitial spacing of "a". Ellipsis 805 indicates that the node string may be extended.

Node array 808 is further comprised of nodes 808a, 808b, 808c and 808d. The nodes have an equal interstitial spacing of "a". Ellipsis 807 indicates that the node string may be extended.

In a preferred embodiment, node array 806 is diametrically opposed to node array 808. In a preferred embodiment, interstitial spacing "a" is approximately 10 meters. Each of the nodes is fixed along x, y plane 801 at a known position, relative to origin 803. In another preferred embodiment, the origin is positioned at node 808d.

Figure 8B:
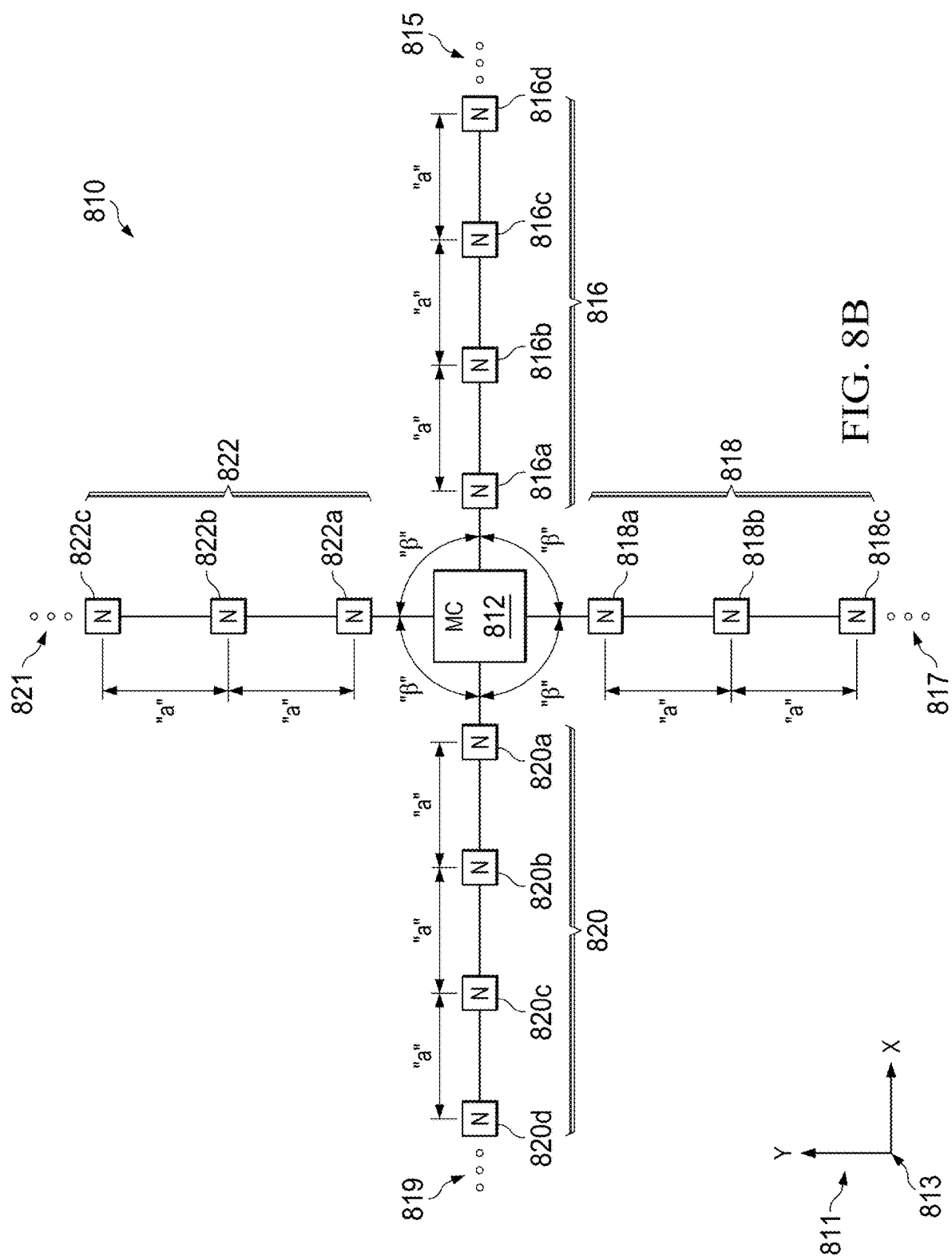

Referring then to FIG. 8B, "quadrilateral node array" 810 will be further described.

Node array 810 is shown in plan view arranged in XY plane 811, having origin 813. Each of the nodes is fixed in XY plane 811 at a known position, relative to the origin.

Master controller 812 is operatively connected to node arrays 816, 818, 820 and 822, and operates the arrays in tandem. Ellipses 815, 817, 819 and 821 indicate that the node arrays may be extended. In the preferred embodiment, each of node arrays 816, 817, 820 and 822 is a dipole-dipole topology.

Node array 816 include nodes 816a, 816b, 816c, and 816d, all operatively connected to master controller 812. Each of the nodes is placed at an equal interstitial spacing of "a".

Node array 818 is further comprised of nodes 818a, 818b, and 818c, all operatively connected to master controller 812. Each of the nodes is at an equal interstitial spacing of "a".

Node array 820 includes nodes 820a, 820b, 820c and 820d, all operatively connected to master controller 812. Each of the nodes is in an equal interstitial spacing of "a".

Node array 822 further comprises nodes 822a, 822b and 822c, all operatively connected to master controller 812. Each of the nodes is placed at an equal interstitial spacing of "a".

In a preferred embodiment, each of the node arrays is linear and is positioned at an angle β from its neighboring node arrays. In a preferred embodiment, angle β is about 90 degrees.

Figure 8C:
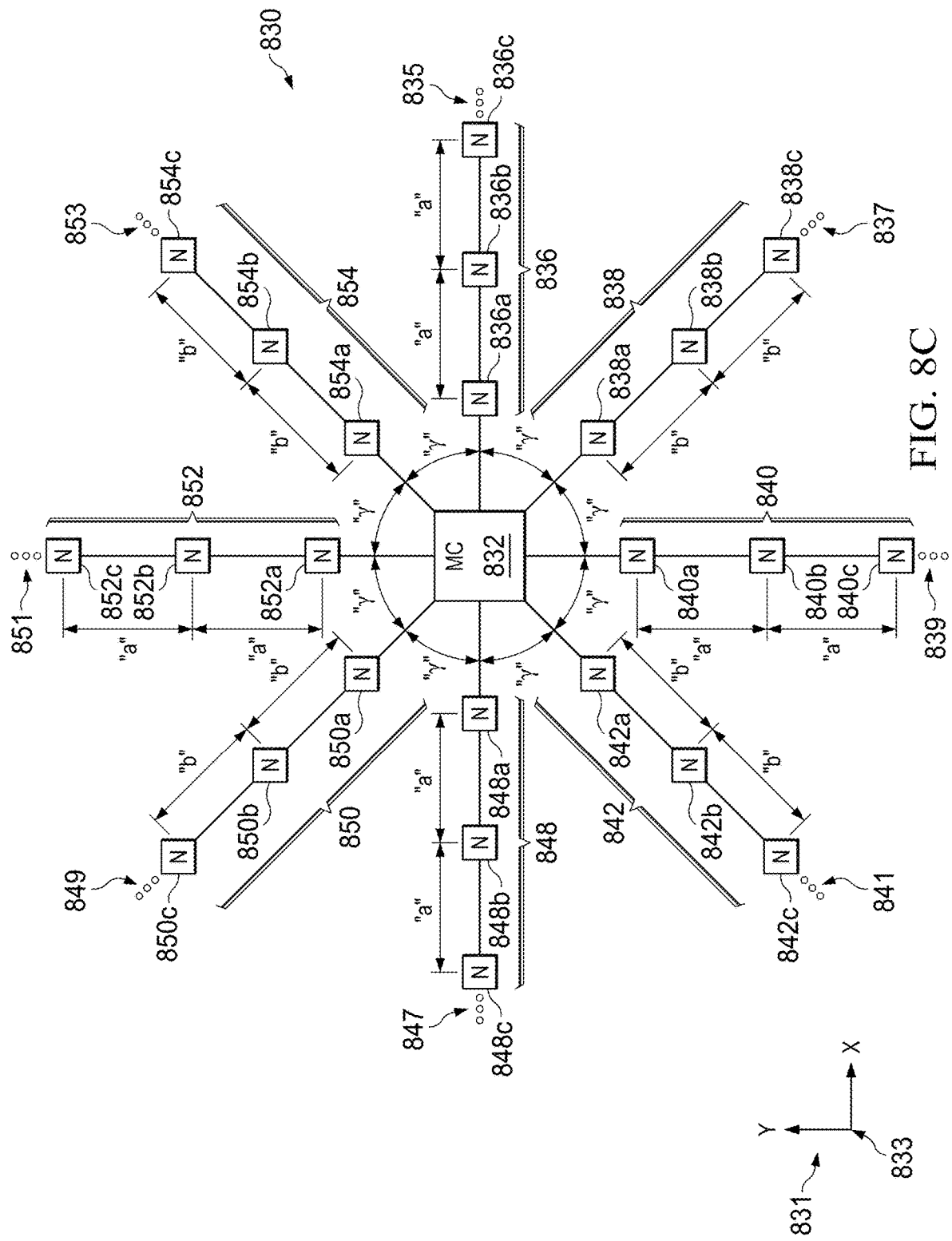

Referring then to FIG. 8C, "star node array" 830 will be further described.

Node Array 830 is shown in plan view arranged in x, y plane 831 having origin 833. Each of the nodes is fixed in x, y plane 831 at a node position, relative to the origin.

Master controller 832 is operatively connected to node arrays 836, 838, 840, 842, 848, 850, and 852, and operates them in tandem. Ellipses 835, 837, 839, 841, 847, 849, 851, and 853, respectively indicate that the node arrays may be extended.

Node array 836 includes nodes 836a, 836b and 836c, all operatively connected to master controller 832. Each of the nodes is placed at an equal interstitial spacing of "a".

Node array 838 includes nodes 838a, 838b and 838c, all operatively connected to master controller 832. Each of the nodes is placed at an equal interstitial spacing of "a".

Node array 840 includes nodes 840a, 840b and 840c, all operatively connected to master controller 832. Each of the nodes is placed at an equal interstitial spacing of "a".

Node array 842 includes nodes 842a, 842b and 842c, all operatively connected to master controller 832. Each of the nodes is placed at an equal interstitial spacing of "a".

Node array 848 includes nodes 848a, 848b and 848c, all operatively connected to master controller 832. Each of the nodes is placed at an equal interstitial spacing of "a".

Node array 850 includes nodes 850a, 850b and 850c, all operatively connected to master controller 832. Each of the nodes is placed at an equal interstitial spacing of "a".

Node array 852 includes nodes 852a, 852b and 852c, all operatively connected to master controller 832. Each of the nodes is placed at an equal interstitial spacing of "a".

Node array 854 includes nodes 854a, 854b and 854c, all operatively connected to master controller 832. Each of the nodes is placed at an equal interstitial spacing of "a".

In a preferred embodiment, each of the node arrays is positioned at an angle λ from its neighboring arrays. In a preferred embodiment, angle λ is about 45 degrees.

Figure 8D:
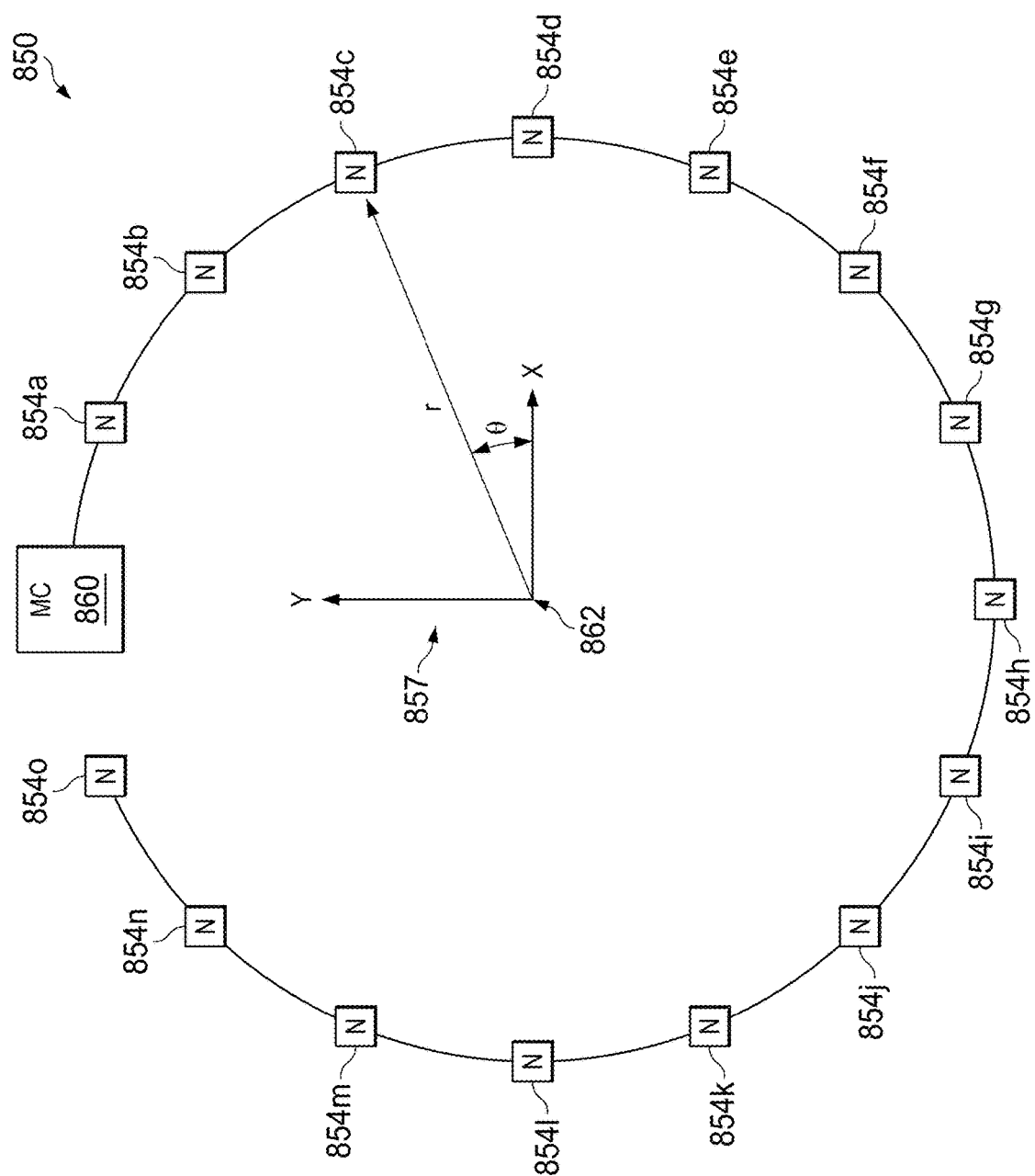

Referring then to FIG. 8D, "ring node array" 850 will be further described. Node array 850 further comprises master controller 860 operatively connected to nodes 854a through 854o. Node array 850 is shown in plan view arranged in x, y plane 857, having origin 862. Each node is placed at a radial distance r from the origin. Each node is positioned at an angle Θ from its neighboring nodes, with respect to the origin. In a preferred embodiment, angle Θ is about 22.5 degrees and r is about 20 meters.

Figure 8E:
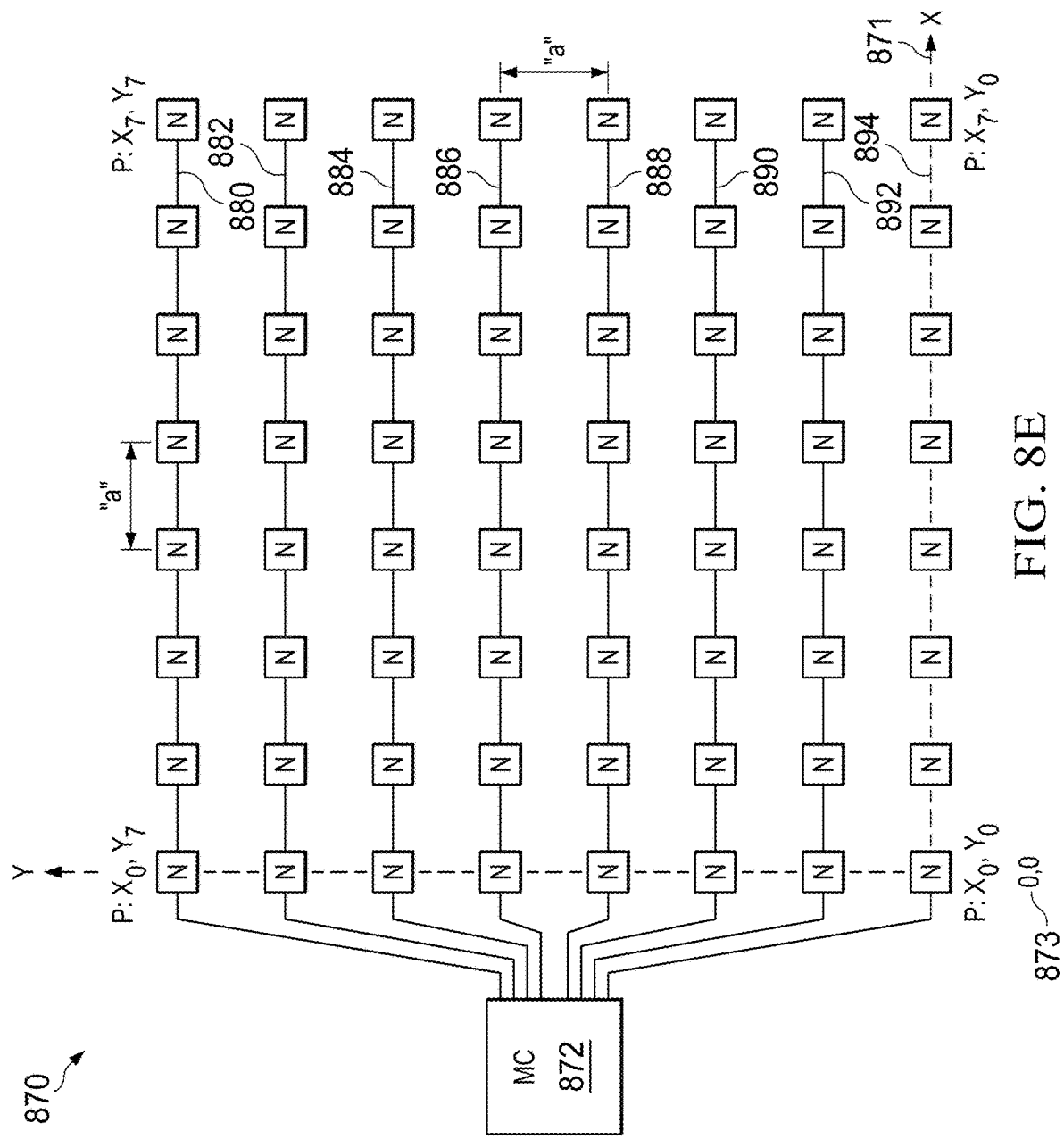

Referring then to FIG. 8E, "grid node array" 870 will be further described. Grid node array 870 is shown in plan view arranged in x, y plane 871, having origin 873. Each of the nodes is fixed in x, y plane 871 at a known position, relative to the origin. Each of the nodes is placed at an equal interstitial spacing of "a" relative to the x axis, and "a" relative to the y axis.

Master controller 872 is operatively connected to node arrays 880, 882, 884, 886, 888, 890, 892 and 894 and operates each in tandem. Each of the node arrays may be extended in the X direction. Likewise, additional node arrays may be added to extend the grid array in the y direction. Thereby, the grid may be extended the length and width of the topology. Each of the nodes is assigned a topology position designated by x, y coordinates, such as P: $x_0$, $y_0$, P: $x_7$, $y_0$, P: $x_0$, $y_7$, and P: $x_7$, $y_7$, as examples.

Referring then to FIGS. 9A, 9B, 9C, 9D and 9E, preferred method 9000 for operation of a seismically triggered intrusion detection system will be further described. In this example, three nodes, 416, 418, and 420 are described. Other node array configurations and topologies which have different numbers of nodes and arrays may be employed, such as those previously described. A single master controller may operate several or many node arrays, as previously described. However, any number of nodes and arrays may exist in the system limited only by a signal to noise ratio.

System setup 9100 includes steps 9102 through 9180.

At step 9102, master controller 412 generates a clock synchronization message. The clock synchronization message includes the master controller clock signature. At step 9104 master controller 412 sends the clock synchronization message to node 414a.

At step 9106, node 414a synchronizes its clock to match the master controller clock signature. At step 9108, node 414a forwards the clock synchronization message to node 414b. At step 9110, node 414b synchronizes its internal clock to match the clock synchronization signal signature. At step 9112, node 414b sends the clock synchronization message to node 414c. At step 9114, node 414c synchronizes its clock to match the master controller clock signature. The clock synchronization procedure is important as it effects relative time measurements necessary to calculate instantaneous velocity and acceleration, as will be further described.

At steps 9130, 9132, 9134, and 9136, master controller 412, node 414a, node 414b, and node 414c, respectively conduct a baseline ERT survey, as will be further described.

At step 9145, master controller 412 sends the baseline ERT survey results for each node to system server 404. At step 9146, system server 404, stores the baseline ERT survey results for later use.

At step 9158, master controller 412 initiates a sensor test, as will be further described. At steps 9160, 9162 and 9164, node 414a, 414b, and 414c, respectively, conduct a baseline sensor test.

At step 9173, master controller 412 sends the baseline sensor test results for each node to system server 404. At step 9174, system server 404 logs the baseline sensor test results for later use. The baseline sensor test is used to calibrate the level of background noise above which threshold levels are set, as will be further described.

At step 9175, 9176, 9178, and 9180 master controller 412, node 414a, node 414b, and node 414c, respectively, enter a sleep mode. In sleep mode, master controller 412 discontinues all processor functions with the exception of monitoring for an interrupt from the communications interface. In sleep mode, nodes 414a, 414b, and 414c discontinue all processor functions with the exception of monitoring for an interrupt signal from the communications interface and the analog to digital converter for trigger signals from the accelerometer, geo-phone and magnetometer sensors.

Manual test command mode 9200 comprises steps 9282 through 9364.

At step 9282, optionally, client device 402 generates a manual test command. At step 9284, optionally, client device 402 sends the manual test command to the system server 404.

At step 9285, optionally, administrator device 408 generates a manual test command. At step 9286, optionally, administrator device 408 sends the manual test command to system server 404.

At step 9287, upon receipt of a manual test command, system server 404 generates a manual test command. At step 9288, system server 404 sends the manual test command to master controller 412.

At steps 9303, 9304, 9306 and 9308, master controller 412, node 414a, node 414b, and node 414c, respectively, conduct an ERT survey.

At step 9318, master controller 412 initiates a sensor test. At steps 9332, 9334 and 9336, nodes 414a, 414b and 414c conduct a sensor test.

At step 9346, master controller 412 forwards the ERT survey results and the sensor test results to system server 404. At step 9348, system server 404 generates a report including the ERT survey results and the sensor test results, as will be further described. At step 9350, system server 404 sends the report to administrator device 408. At step 9352, the administrator device 408 logs the report.

At step 9354, system server 404 sends a report to client device 402. At step 9356, client device 402 displays the report.

At steps 9358, 9360, 9362 and 9364, master controller 412, node 414a, node 414b, and node 414c, respectively, enter sleep mode, as previously described.

Monitor mode 9500 comprises steps 9502 through 9630.

At step 9502, node 414a detects a trigger event, as will be further described. At step 9504, node 414a restarts its processor including all nonessential services.

At step 9506, node 414a generates a wake-up signal. At step 9508, node 414a sends the wake-up signal to master controller 412. At step 9510, master controller 412 restarts its processor including all nonessential services. At step 9512, node 414a sends the wake-up signal to node 414b. At step 9514, node 414b restarts its processor including all nonessential services. At step 9516, node 414b sends the wake-up signal to node 414c. At step 9518, node 414c restarts its processor including all nonessential services. At step 9519, node 414c generates an acknowledge signal. At step 9524, node 414c sends the acknowledge signal to node 414b. At step 9525, node 414b generates an acknowledge signal. At step 9526, node 414b sends its acknowledge signal and the acknowledge signal from node 414c to node 414a. At step 9527, node 414a generates an acknowledge signal. At step 9528, node 414a sends its acknowledge signal and the acknowledge signals from node 414b and 414c to master controller 412.

In this example, node 414a detects a trigger event. However, in other embodiments, node 414b, node 414c, or any other node in the array, may detect the trigger event, restart its processor, and generate the wake-up signal and send the wake-up signal to its neighboring nodes in the array.

At step 9529, master controller 412 logs the acknowledge signals from the nodes.

At step 9530, after receiving an acknowledge signal from each node in the array, master controller 412 initiates a sensor test. At steps 9535, 9536, and 9537, nodes 414a, 414b and 414c, respectively, conduct sensor tests, as will be further described. At steps 9538, 9539 and 9540, each of nodes 414a, 414b and 414c, construct a sensor table. The sensor tables include an entry for each sensor, in each node, indexed by a timestamp, and a test number. In a preferred embodiment, each column of each table is indexed by timestamps which are separated by equal increments of approximately 500 milliseconds, as will be further described.

At step 9541, node 414c sends its timestamp sensor table to node 414b. At step 9542, node 414b sends its timestamp sensor table and the timestamp sensor table from node 414c to node 414a. At step 9543, node 414a sends its timestamp sensor table and a timestamp sensor table, for each node, from node 414b and the timestamp sensor table from node 414c to master controller 412.

At step 9544, the time stamp sensor tables are stored in memory.

At step 9545, the master controller compares each entry in each timestamp sensor table to a corresponding minimum threshold value for each sensor type. In a preferred embodiment, the corresponding minimum threshold values are set about 25% higher than the background noise of the system represented by their corresponding entries from the background sensor test. In another preferred embodiment, where the background noise is low, or not measurable, the minimum threshold value for the geophone is about 5 volts/meter/second; the minimum threshold value for the accelerometer is about 10 Hz for vibration and 0.1 gram for displacement; the minimum threshold value for the magnetometer is about 0.5 mT (millitesla). Of course, other minimum threshold values may be set. If any entry in any timestamp table exceeds its corresponding minimum threshold value, then the master controller proceeds to step 9546, if not, master controller 412 proceeds to step 9547. In this way, the system continues to monitor the surface conditions above the array until the trigger event has dissipated or moved out of range.

At step 9546, the master controller monitors a timeout condition. The timeout condition generates an elapsed time counter which runs until an expiration condition has been reached. If the timeout condition has been reached, then the master controller moves to step 9547. If the timeout condition has not been reached, then the master controller returns to step 9530. In a preferred embodiment, the expiration condition is a lapsed time of 1 hour from the trigger event. But of course, other expiration conditions may be set.

At step 9547, master controller 412 generates a stop command. At step 9556, master controller 412 sends the stop command to node 414a. At step 9558, node 414a ceases collecting sensor data. At step 9560, node 414a sends the stop command to node 414b. At step 9562, node 414b ceases collecting sensor data. At step 9564, node 414b sends the stop command to node 414c. At step 9566, node 414c ceases collecting sensor data.

At steps 9582, 9584, 9586, and 9588, master controller 412, node 414a, node 414b, node 414c, respectively, participate in taking an ERT survey, as will be further described. At step 9596, master controller 412 logs the survey results of the nodes in the array. At step 9597, master controller 412 sends the timestamp sensor tables and the ERT survey results from the array to system server 404.

At step 9598, system server 404 stores the timestamp sensor tables and the ERT survey results from the array.

At step 9604, system server 404 conducts a sensor comparison analysis, as will be further described.

At step 9608, system server 404 conducts an ERT comparison analysis, as will be further described.

At step 9610, system server 404 generates a report based on the sensor comparison analysis and the ERT comparison analysis. At step 9616, system server 404 sends the report to administrator device 418. At step 9618, administrator device displays the report.

At step 9620, system server 404 sends the report to client device 402. At step 9622, client device 402 displays the report.

At steps 9624, 9626, 9628 and 9630, master controller 412, node 414a, node 414b, and node 414c, respectively, enter sleep mode.

Figure 9A:
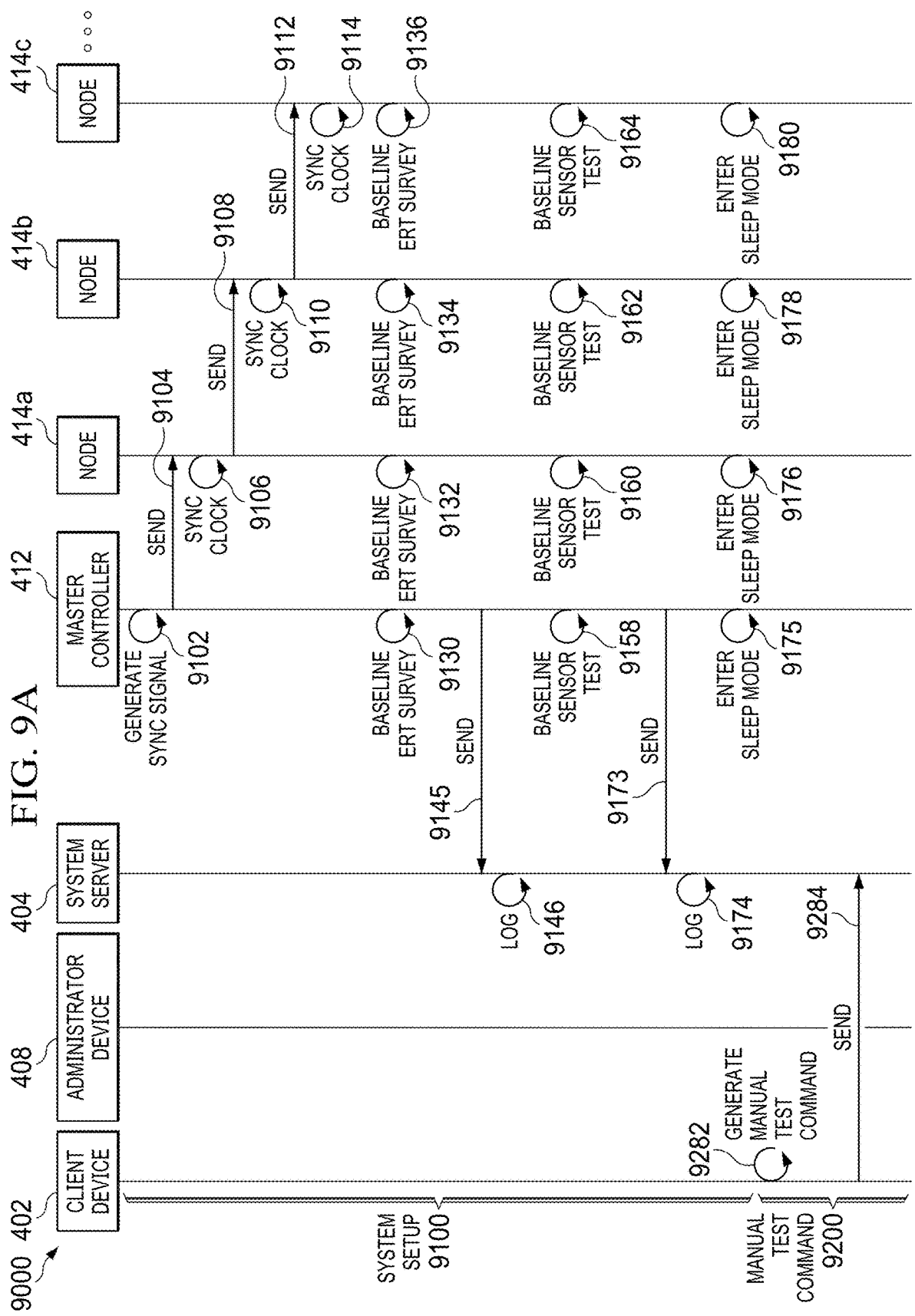
Figure 9D:
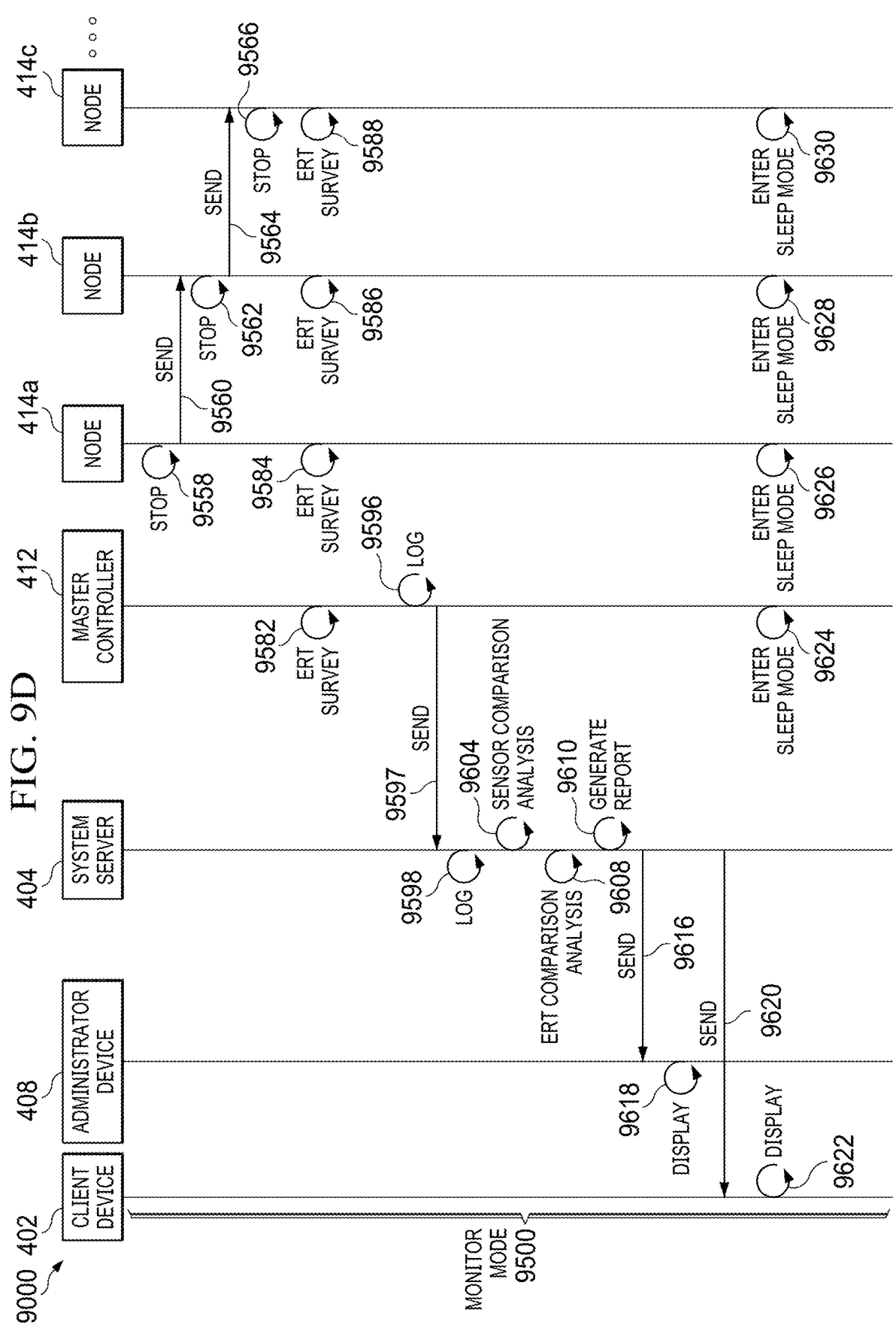
FIG. 9D depicts a preferred method of conducting an ERT survey.
Figure 9E:
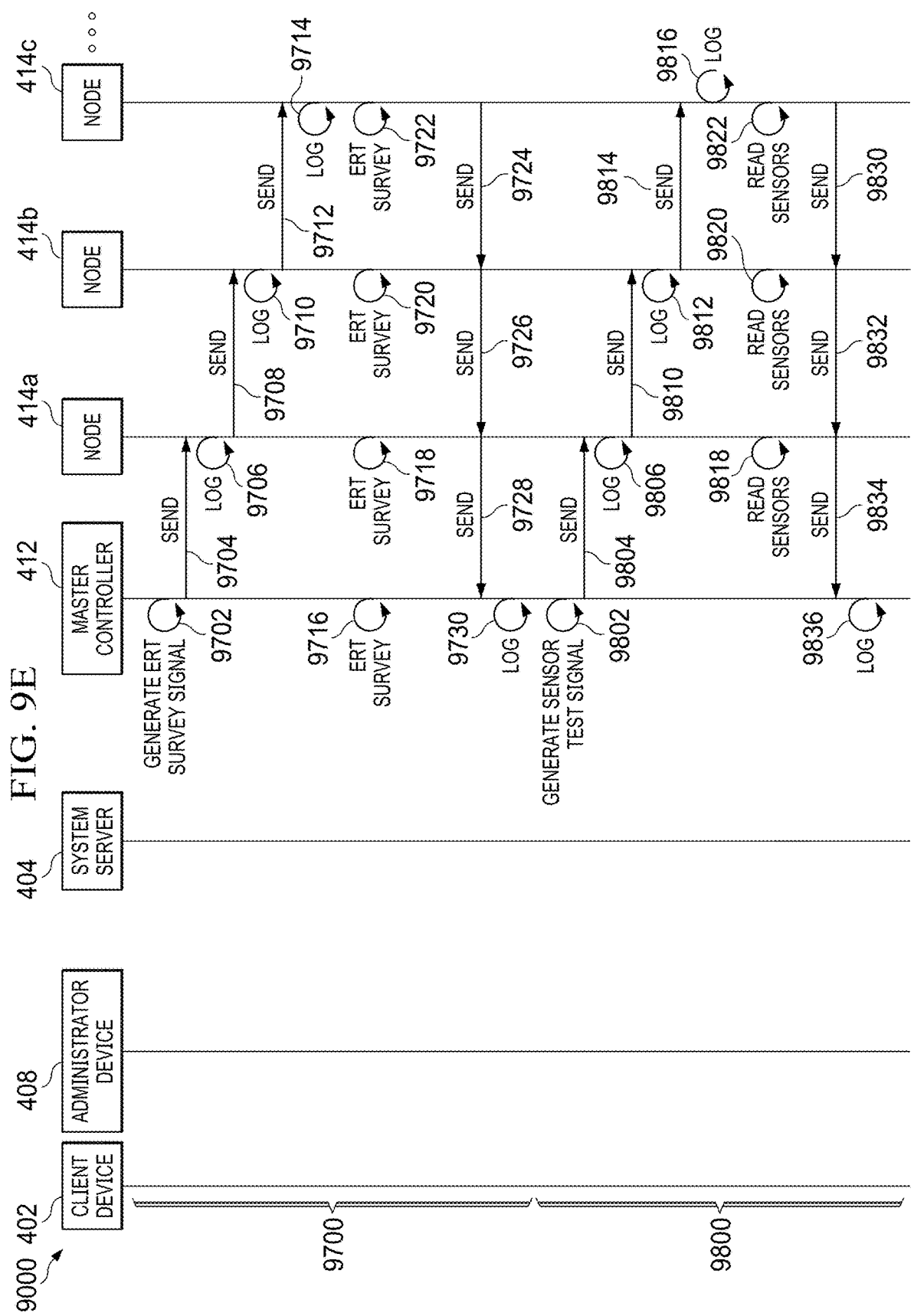
FIG. 9E depicts preferred method of conducting a sensor test.

Referring then to FIG. 9E, preferred method 9700 for conducting an ERT survey will be further described. At step 9702, master controller 412 generates an ERT test signal. At step 9704, master controller 412 sends the test signal to node 414a. At step 9706, node 414a logs the test signal and prepares to conduct an ERT test. At step 9708, node 414a forwards the test signal to node 414b. At step 9710, node 414b logs the test signal and prepares to conduct an ERT test. At step 9712, node 414b sends the test signal to node 414c. At step 9714, node 414c logs the test signal and prepares to conduct an ERT test.

At steps 9716, 9718, 9720, and 9722, master controller 412, node 414a, node 414b, and node 414c, respectively, conduct an ERT test. A preferred method of conducting an ERT test is disclosed in U.S. Pat. No. 8,321,160 to Bryant, incorporated herein by reference for all purposes.

At step 9724, node 414c sends the ERT test results to node 414b. At step 9726, node 414b forwards the test results from 414c and its own test results to node 414a. At step 9728, node 414a sends the test results from 414c, the test results from 414b, and its own test results to master controller 412. At step 9730, master controller 412 stores the test results in memory, for later use.

Referring then to FIG. 9E, preferred method 9800 for conducting a sensor test will be further described.

At step 9802, master controller 412 generates a sensor test signal. At step 9804, the master controller sends the sensor test signal to node 414a. At step 9806, node 414a logs the sensor test signal. At step 9810, node 414a sends the sensor test signal to node 414b. At step 9812, node 414b logs the sensor test signal. At step 9814, node 414b sends the sensor test signal to node 414c. At step 9816, node 414c logs the sensor test signal.

At steps 9818, 9820, and 9822, nodes 414a, 414b, and 414c, respectively, take sensor readings of frequency and amplitude values from all onboard sensors and stores them in a timestamp sensor table. Preferably, each of steps 9818, 9820, and 9822 occurs simultaneously. In the same way, each of the following periodic readings at each node should be synchronized to occur at the same time. In a preferred embodiment, sensor readings are taken every 0.25 to 0.5 seconds. Prophetic examples of tables of frequency and amplitude values recorded by a group of nodes 414a, 414b and 414c at timestamp intervals of 0.01 seconds are shown below.

TABLE 2

| | Node 414a, position $x_0$, $y_0$ | | | | | |
|---|---|---|---|---|---|---|
| Time | 17:52:00 | 17:52:01 | 17:52:02 | 17:52:03 | 17:52:04 | 17:52.05 |
| Geophone Frequency | 890 Hz | 900 Hz | 925 Hz | 933 Hz | 922 Hz | 879 Hz |
| Accelerometer Amplitude | 0.41 g | 0.52 g | 1.08 g | 3.20 g | 0.90 g | 0.30 g |
| Magnetometer Amplitude | 0.49 mT | 0.49 mT | .049 mT | 0.50 mT | 0.49 mT | 0.49 mT |
| Geophone Amplitude | 0 v/m/s | 3.2 v/m/s | 7.6 v/m/s | 14.42 v/m/s | 7.6 v/m/s | 3.2 v/m/s |

TABLE 3

| | Node 414b, position $x_1$, $y_0$ | | | | | |
|---|---|---|---|---|---|---|
| Time | 17:52:00 | 17:52:01 | 17:52:02 | 17:52:03 | 17:52:04 | 17:52.05 |
| Geophone Frequency | 600 Hz | 750 Hz | 890 Hz | 900 Hz | 925 Hz | 933 Hz |
| Accelerometer Amplitude | 0.0 g | 0.4 g | 0.41 g | 0.52 g | 1.08 g | 3.20 g |
| Magnetometer Amplitude | 0.49 mT | 0.49 mT | 0.49 mT | 0.49 mT | 0.49 mT | 0.50 mT |
| Geophone Amplitude | 0 v/m/s | 0 v/m/s | 0 v/m/s | 3.2 v/m/s | 7.6 v/m/s | 14.42 v/m/s |

TABLE 4

| | Node 414c, position $x_2$, $y_0$ | | | | | |
|---|---|---|---|---|---|---|
| Time | 17:52:00 | 17:52:01 | 17:52:02 | 17:52:03 | 17:52:04 | 17:52.05 |
| Geophone Frequency | 560 Hz | 600 Hz | 725 Hz | 750 Hz | 890 Hz | 900 Hz |
| Accelerometer Amplitude | 0.0 g | 0.0 g | 0.0 g | 0.4 g | 0.41 g | 0.52 g |
| Magnetometer Amplitude | 0.49 mT | 0.49 mT | 0.49 mT | 0.49 mT | 0.49 mT | 0.49 mT |
| Geophone Amplitude | 0 v/m/s | 0 v/m/s | 0 v/m/s | 0 v/m/s | 0 v/m/s | 3.2 v/m/s |

At step 9830, node 414c sends its timestamp sensor table to node 414b. At step 9832, node 414b sends its timestamp sensor table and the timestamp sensor table of node 414c to node 414a. At step 9834, node 414a sends the timestamp sensor table from node 414c, node 414b, and itself to master controller 412. At step 9836, master controller 412 logs the timestamp sensor tables.

Figure 10A:
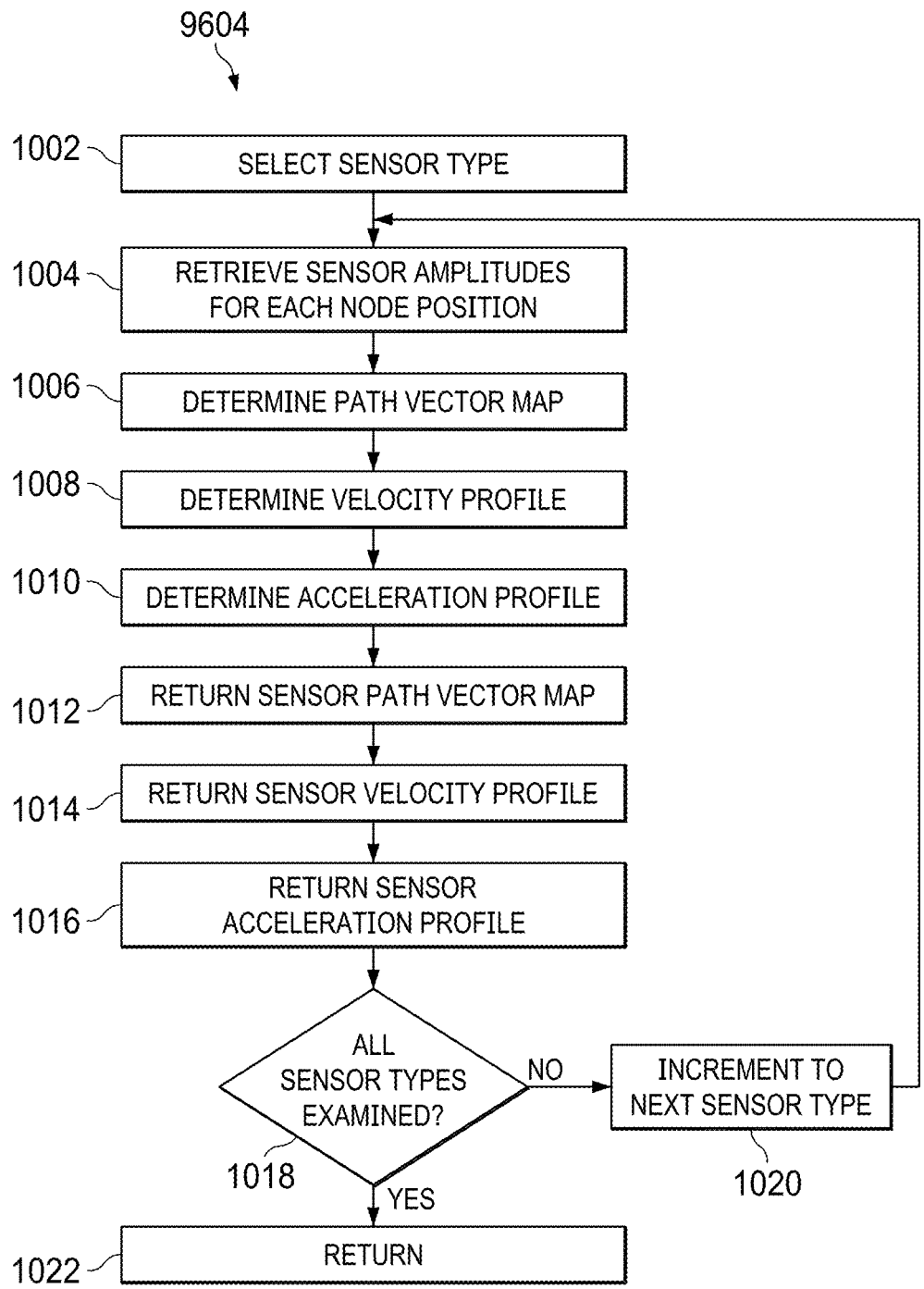
FIG. 10A is a flowchart of a preferred method of ERT map image differentiation.

Referring then to FIG. 10A, the sensor comparison analysis of step 9604 will be further described.

At step 1002, the system server selects a sensor type. In a preferred embodiment, the sensor types include a geophone, an accelerator, and a magnetometer, as previously described.

At step 1004, the system server retrieves all amplitude readings from the timestamp sensor tables, indexed by time, for each node at each node position for the chosen sensor type.

At step 1006, the system server determines a path vector map, as will be further described. At step 1008, the system server determines a velocity profile from the path vector map, as will be further described. At step 1010, the system server determines an acceleration profile from the velocity profile map, as will be further described.

At step 1012, the system server returns the path vector map for the chosen sensor type. At step 1014, the system server returns a velocity profile map for the chosen sensor type. At step 1016, the system server returns the acceleration profile map for the chosen sensor type.

At step 1018, the system server determines whether or not all sensor types for the array have been examined. If so, the system server moves to step 1022. If not, the system server moves to step 1020.

At step 1020, the system server advances to the next sensor type, and returns to step 1004.

At step 1022, the system server returns to the main routine.

Figure 10B:
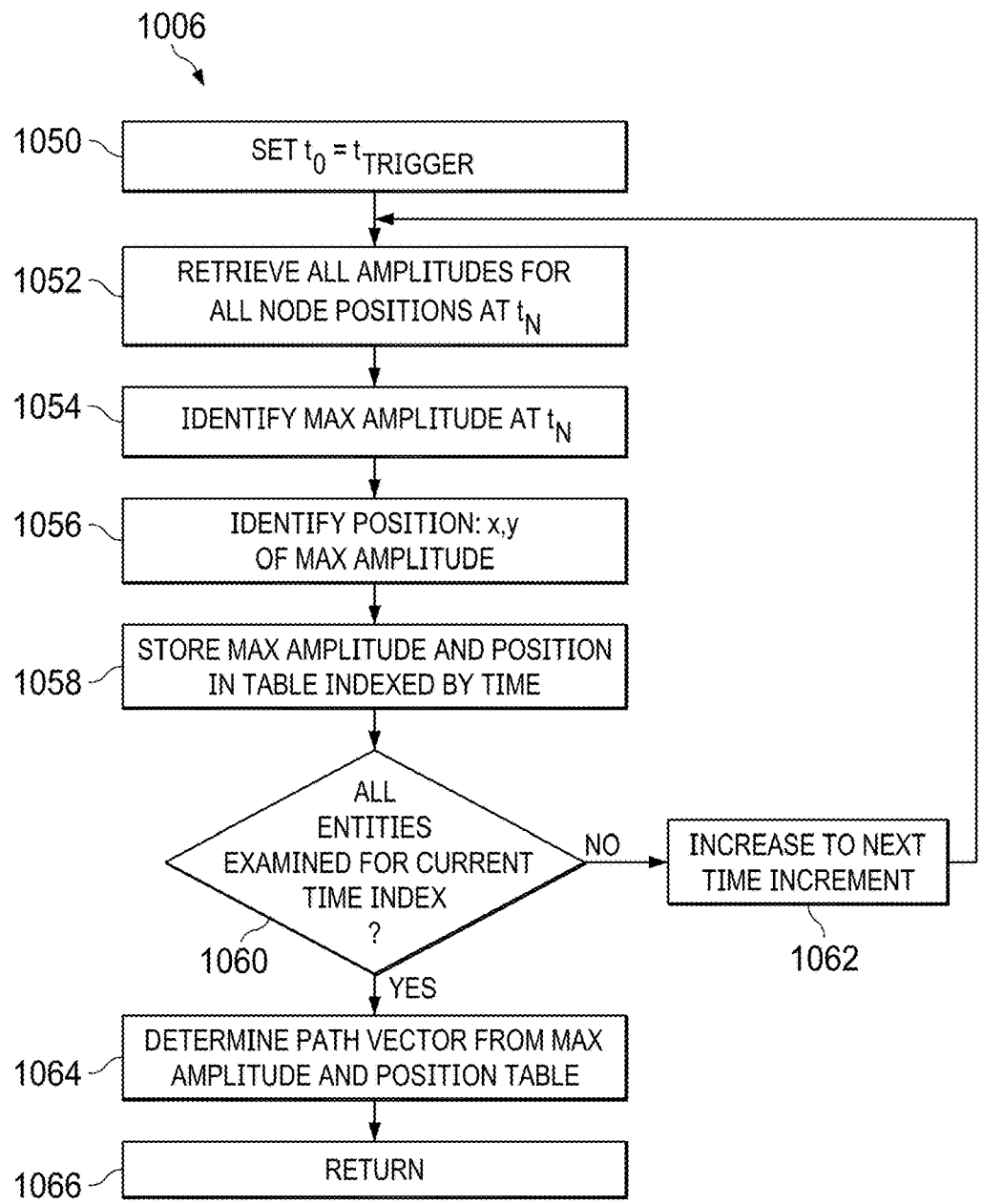
FIG. 10B is a flowchart of a preferred method of path map generation.

Referring then to FIG. 10B, the step of determining a path vector map of step 1006 will be further described.

At step 1050, the system server sets $t_0 = t_{trigger}$.

At step 1052, the system server retrieves all amplitudes for all node positions at time tn. At step 1054, the system server identifies the maximum amplitude at time $t_n$.

At step 1056, the system server identifies the x, y position of the node at which the maximum amplitude at time $t_n$ occurred.

At step 1058, the system server stores the maximum amplitude and the x, y position of the maximum amplitude in a maximum amplitude position table indexed by time. A prophetic example of a maximum amplitude position table for an accelerometer sensor is shown in Table 5 below. Similar maximum amplitude position tables will be generated for all sensor types.

TABLE 5

| n | t | x | y | Accelerometer Amplitude |
|---|---|---|---|---|
| 0 | 17:52:00 | $x_0$ | $y_1$ | 0.41 g |
| 1 | 17:52:01 | $x_1$ | $y_4$ | 0.52 g |
| 2 | 17:52:02 | $x_2$ | $y_1$ | 1.08 g |
| 3 | 17:52:03 | $x_4$ | $y_4$ | 3.20 g |
| 4 | 17:52:04 | $x_4$ | $y_6$ | 1.08 g |

TABLE 5-continued

| n | t | x | y | Accelerometer Amplitude |
|---|---|---|---|---|
| 5 | 17:52:05 | $x_5$ | $y_4$ | 3.20 g |
| 6 | 17:52:06 | $x_6$ | $y_6$ | 2.20 g |
| 7 | 17:52:07 | $x_7$ | $y_7$ | 3.20 g |

At step 1060, the system server determines whether or not all amplitude entries for each node position for time index $t_n$ have been examined. If so, the system server moves to step 1064. If not, the system server moves to step 1062.

At step 1062, the system server increments the next time index, $t_{n+1}$, and returns to step 1052.

At step 1064, the system server determines the path vector from the maximum amplitude and position table, as will be further described. At step 1066, the system server returns to the main routine.

Figure 10C:
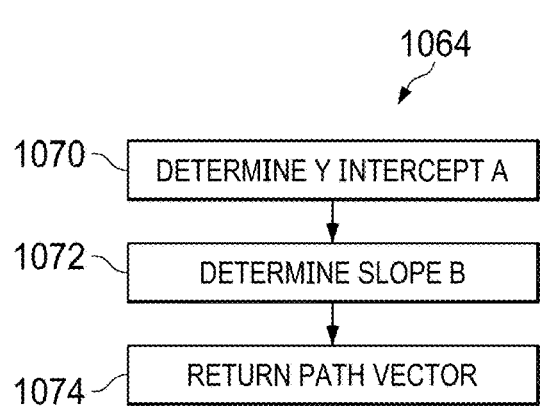
FIG. 10C is a flowchart of a preferred method of path determination.

Referring to FIG. 10C, the step of determining the path vector from a maximum amplitude and position table of step 1064, using linear regression analysis, will be further described.

At step 1070, the y intercept, "b", is determined from the following equation:

$$b = \frac{n(\Sigma y)(\Sigma x^2) - (\Sigma x)(\Sigma xy)}{n(\Sigma x^2) - (\Sigma x)^2}$$

Where:
y=the position of the maximum amplitude node relative to the y axis, for each time increment $t_n$;
x=the position of the maximum amplitude node relative to the x axis, for each time increment $t_n$; and,
n=the index number of time increments, $t_0$ to $t_n$.

At step 1072, slope, "m", is determined from the following equation:

$$m = \frac{n(\Sigma xy) - (\Sigma x)(\Sigma y)}{n(\Sigma x^2) - (\Sigma x)^2}$$

Where:
y=the position of the node relative to the y-axis;
x=to the position of the node relative to the x-axis; and,
n=the index number of time increments, $t_0$ to $t_n$.

At step 1074, the path vector is returned according to the following equation:

$$y = mx + b$$

Where:
b=the y intercept; and,
m=the slope.

Other equations may be used to determine a path given the maximum amplitude and position table.

Figure 10D:
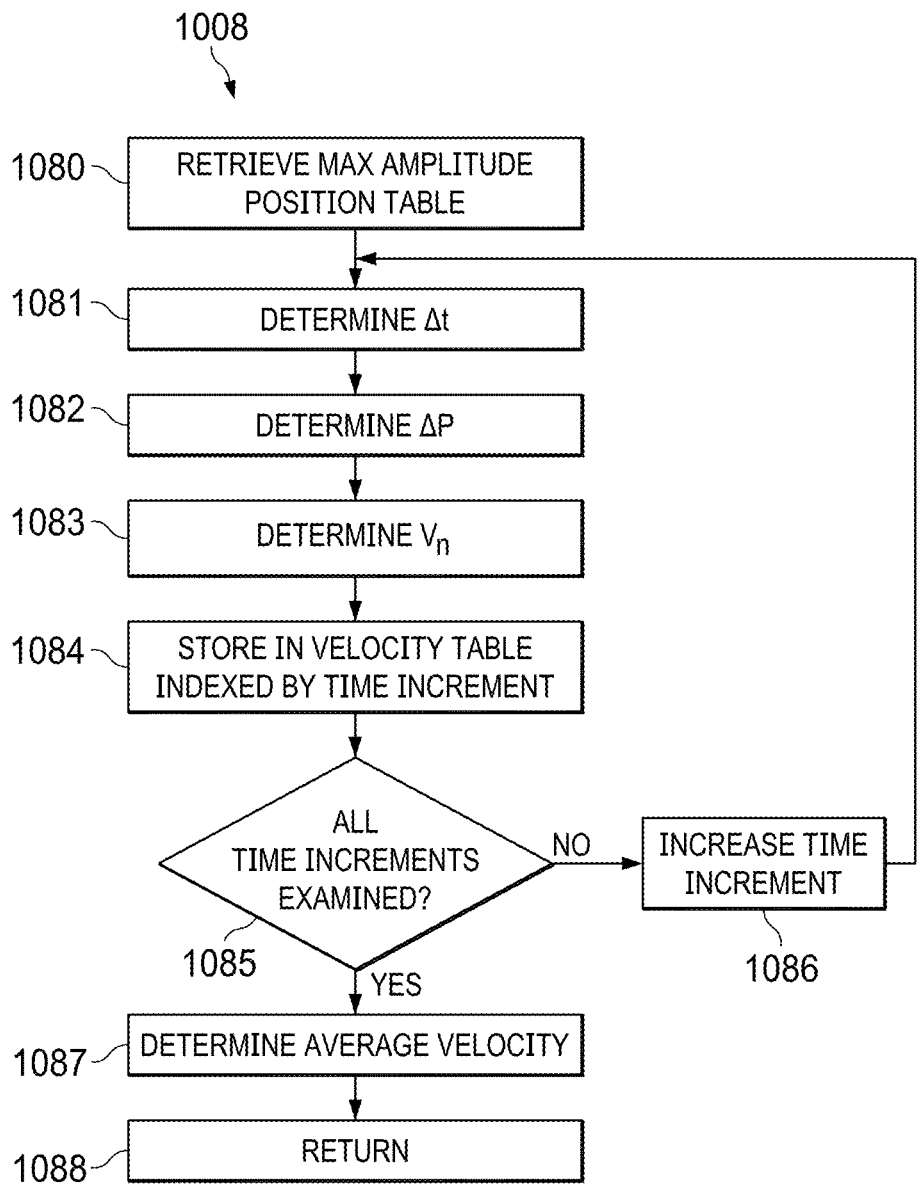
FIG. 10D is a flowchart of a preferred method of path velocity determination.
Figure 11:
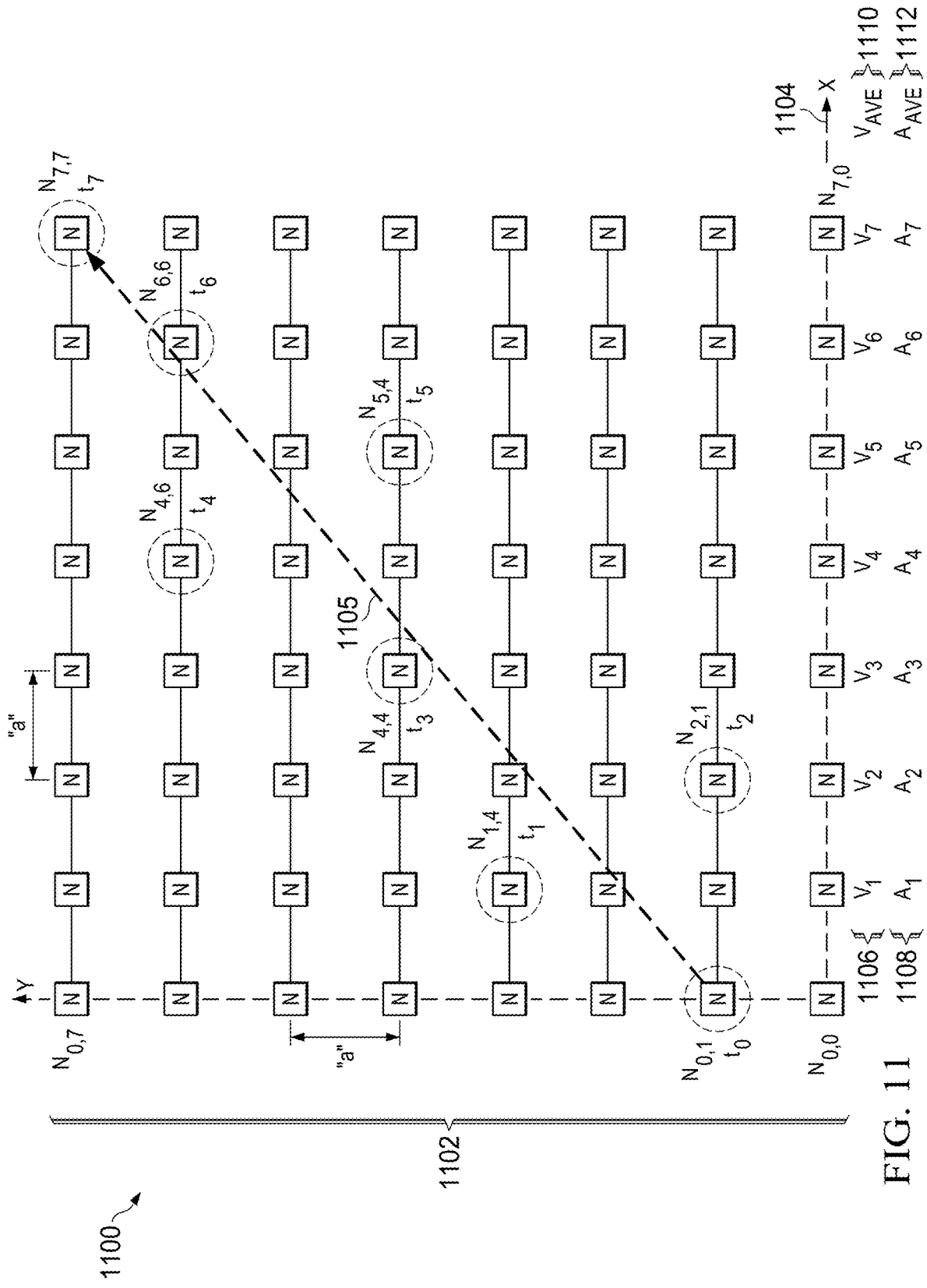
FIG. 11 is an exemplary path map and movement report.

Referring to FIGS. 10D and 11, the step of determining a velocity profile of step 1008 will be further described.

At step 1080, the system server retrieves the maximum amplitude and position table.

At step 1081, the system server determines the difference in time, $\Delta t$, between the current time increment and the next time increment in the maximum amplitude and position table according to the following equation:

$$\Delta t = t_n - t_{n-1}$$

Where:
t=time entry; and,
n=index number.

At step 1082, the system server determines the change in position, $\Delta P$, along the path vector for each internode spacing "a" along the x-axis as follows.

$$\Delta P = \sqrt{a^2 + (b - ma)^2}$$

Where:
n=index number;
a=internode spacing along the x-axis;
b=the y intercept of the path vector; and,
m=the slope of the path vector.

At step 1083, the system server determines the instantaneous velocity at the current time increment position according to the following equation:

$$V_n = \frac{\Delta P}{\Delta t}$$

Where:
$\Delta P$=the change in position; and,
$\Delta t$=the change in time.

At step 1084, the instantaneous velocity is stored in a velocity table indexed by time increment.

At step 1085, the system server determines whether or not all time increments in the maximum amplitude and position table have been examined. If not, the system server moves to step 1086. If so, the system server moves to step 1087.

At step 1086, the system server increases the time increment and returns to step 1081.

At step 1087, the system server determines the average velocity according to the following equation:

$$V_{ave} = \frac{\Sigma_0^n v_n}{n}$$

Where:
$v_n$=instantaneous velocity at each time increment; and,
n=index number.

At step 1088, the system server returns the velocity table at each time increment and the average velocity.

Figure 10E:
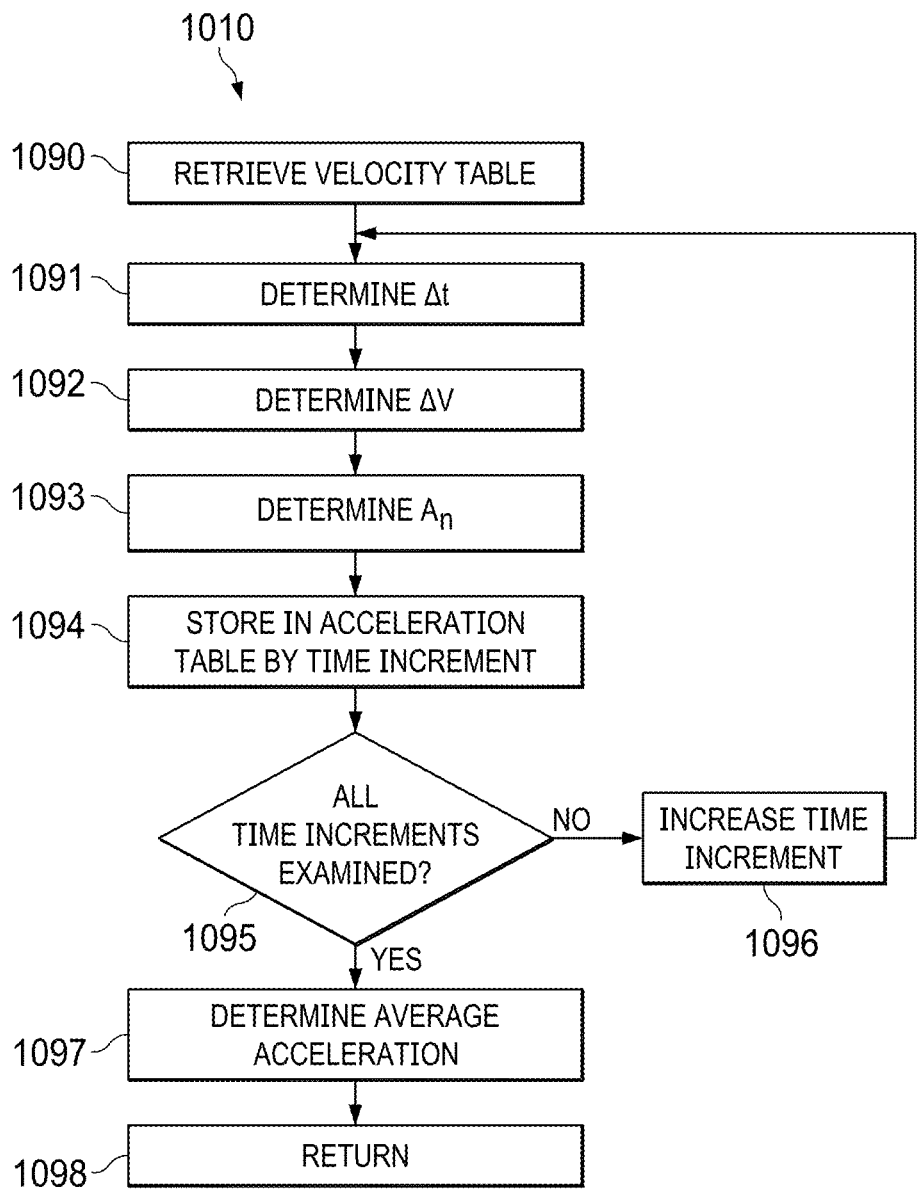
FIG. 10E is a flowchart of a preferred method of path acceleration determination.

Referring to FIG. 10E, the step of determining acceleration profile of step 1010 will be further described.

At step 1090, the system server retrieves the velocity table.

At step 1091, the system server determines the change in time, $\Delta t$ according to the following equation:

$$\Delta t = t_n - t_{n-1}$$

At step 1092, the system server determines the change in velocity according to the following equation:

$$\Delta = v_n - v_{n-1}$$

Where:
$\Delta v$=change in velocity;
$v_n$=instantaneous velocity at $t_n$; and,
n=index number.

At step 1093, the system server determines the instantaneous acceleration according to the following equation.

$$A_n = \frac{\Delta v}{\Delta t}$$

At step 1094, the system server stores the instantaneous acceleration in a table indexed by time increment.

At step 1095, system server determines whether or not all time increments have been examined. If not, the system server moves to step 1096. If so, the system server moves to step 1097.

At step 1096, the system server increases the time increment and returns to step 1091.

At step 1097, the system server determines the average acceleration according to the following equation:

$$A_{ave} = \frac{\Sigma_0^n A_n}{n}$$

Where:
$A_{ave}$=average acceleration;
$A_n$=instantaneous velocity; and,
n=index number.

At step 1098, the system server returns.

Figure 10F:
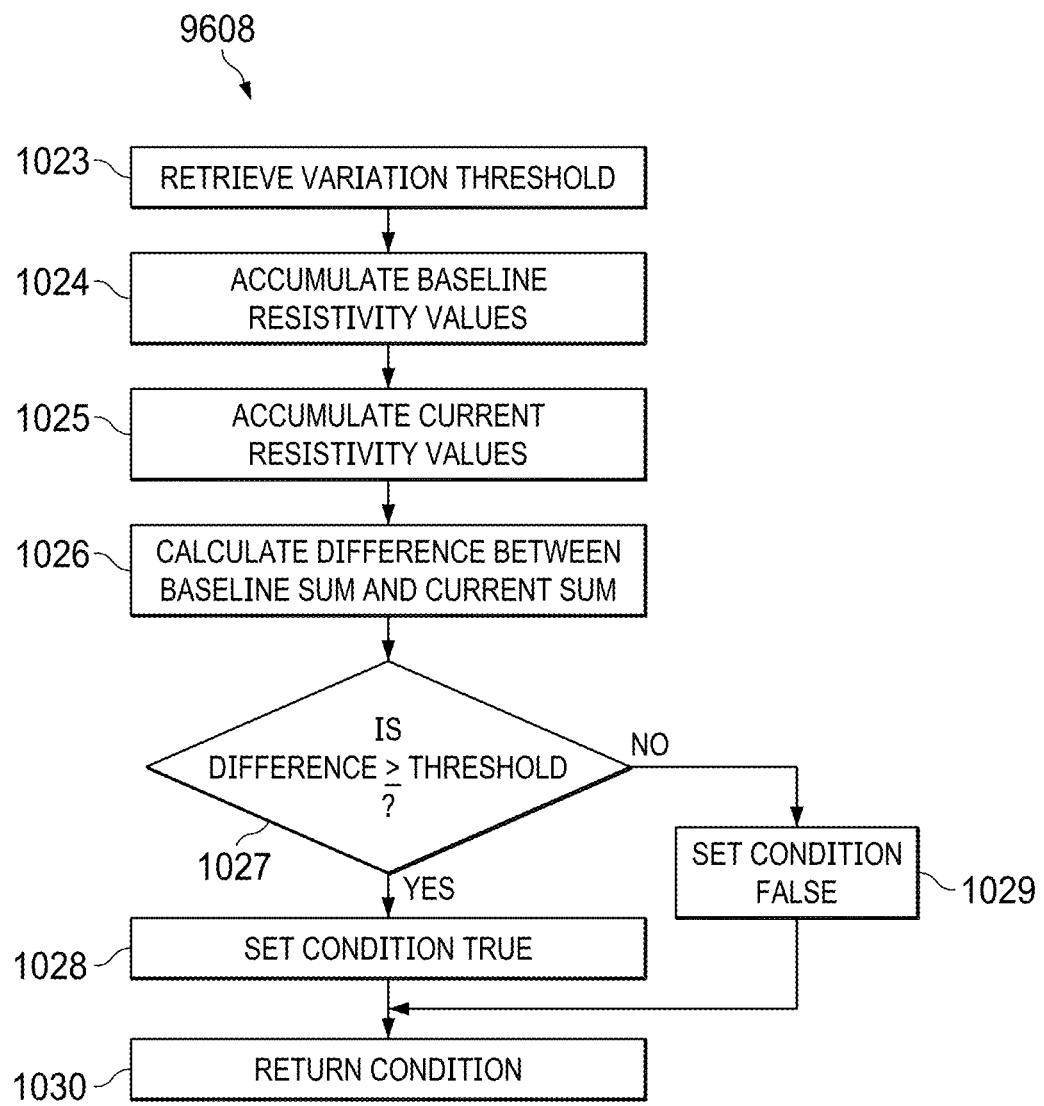
FIG. 10F is a flowchart of a preferred method of resistivity image differentiation.

Referring into FIG. 10F the ERT comparison analysis of step 9608 will be further described.

At step 1023, system server 404 retrieves the variation threshold from memory. The variation threshold is a measure of the sensitivity at which point the system will send an alert because of the variance between the baseline resistivity map and the current resistivity map, as will be further described. In a preferred embodiment, the variation threshold is approximately 75%.

At step 1024, system server 404 accumulates all resistivity values in the baseline resistivity map according to the following equation:

$$BRT = \sum_{0,0}^{x,y} rB_{xy}$$

Where:
BRT=baseline resistivity value total; and,
$rB_{xy}$=resistivity value for node in the x, y position in the baseline survey.

At step 1025, system server 404 accumulates all the resistivity values in the current resistivity map from the current ERT survey according to the following equation:

$$CRT = \sum_{0,0}^{x,y} rC_{xy}$$

Where:
CRT=current resistivity value total; and,
$rC_{xy}$=resistivity value for node in the x, y position in the current survey.

At step 1026, the system server calculates a variation between the accumulated baseline resistivity values and the accumulated current resistivity values according to the following equation:

$$\text{Variation} = \frac{BRT}{CRT} \times 100\%$$

Where:
BRT=baseline resistivity value total; and,
CRT=current resistivity value total.

At step 1027, system server 404 compares the variation to the variation threshold. If the variation is equal to or greater than the variation threshold then system server 404 moves to step 1028. If not, system server moves to step 1029.

At step 1028, system server generates a "true" condition and moves to step 1030. At step 1029, the system server generates a "false" condition and moves to step 1030.

At step 1030, system server returns the condition status to the main routine.

Figure 10G:
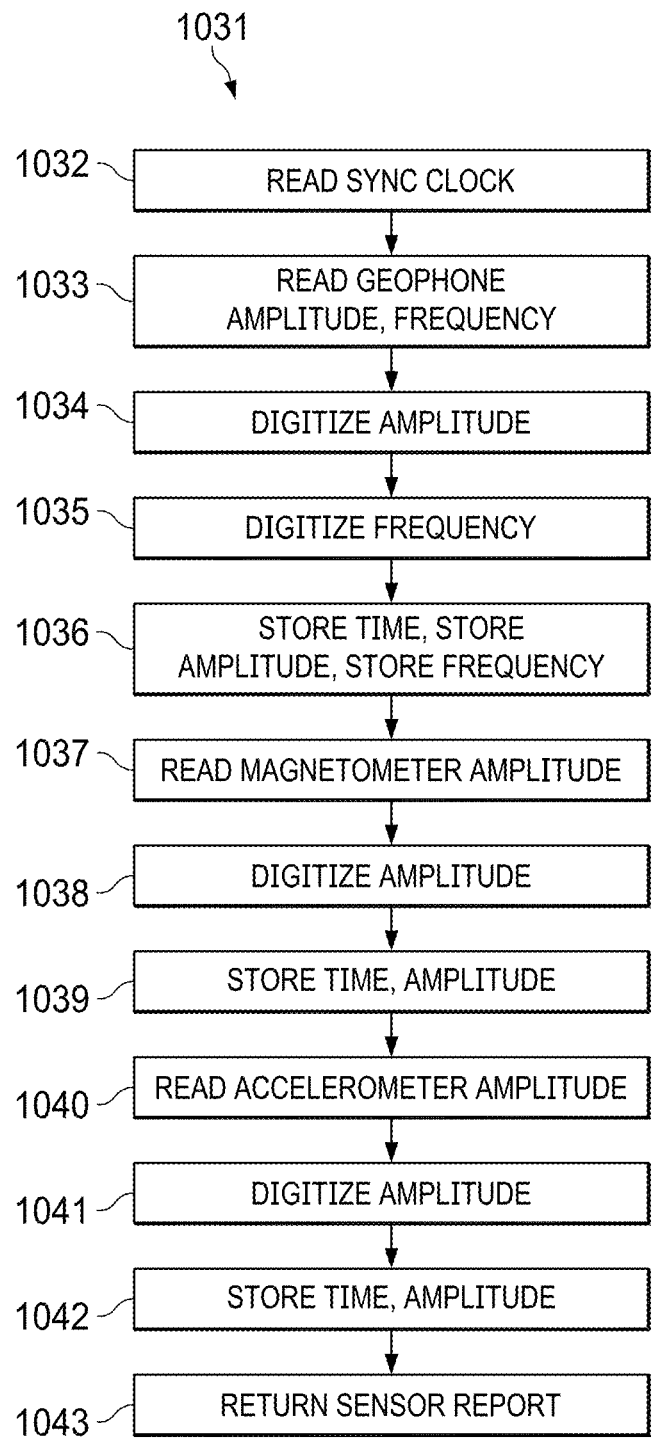
FIG. 10G is a flowchart of a preferred method of sensor report generation.

Referring then to FIG. 10G, a preferred method of conducting a sensor test, 1031 will be further described.

At step 1032, a node processor reads time to from the synchronization clock.

At step 1033, the node processor reads the geophone amplitude and frequency. At step 1034, the node processor digitizes the amplitude with the analog to digital converter.

At step 1035, the node processor digitizes the frequency value.

At step 1036, the node processor stores the time signature, the digitized amplitude and the digitized frequency.

At step 1037, the node processor reads the magnetometer amplitude. At step 1038, the node processor digitizes the magnetometer amplitude. At step 1039, the node processor stores the time signature and the digitized magnetometer amplitude.

At step 1040, the node processor reads the accelerometer amplitude. At step 1041, the node processor digitizes the accelerometer amplitude. At step 1042, the node processor stores the time signature and the digitized accelerometer amplitude.

At step 1043, the node processor returns a sensor report including the digitized time signature, the digitized geophone amplitude, the digitized signal frequency, the digitized magnetometer amplitude, and the digitized accelerometer amplitude, along with a node address. In a preferred embodiment, the node identifier also includes the x, y position of the node in the array.

Figure 10H:
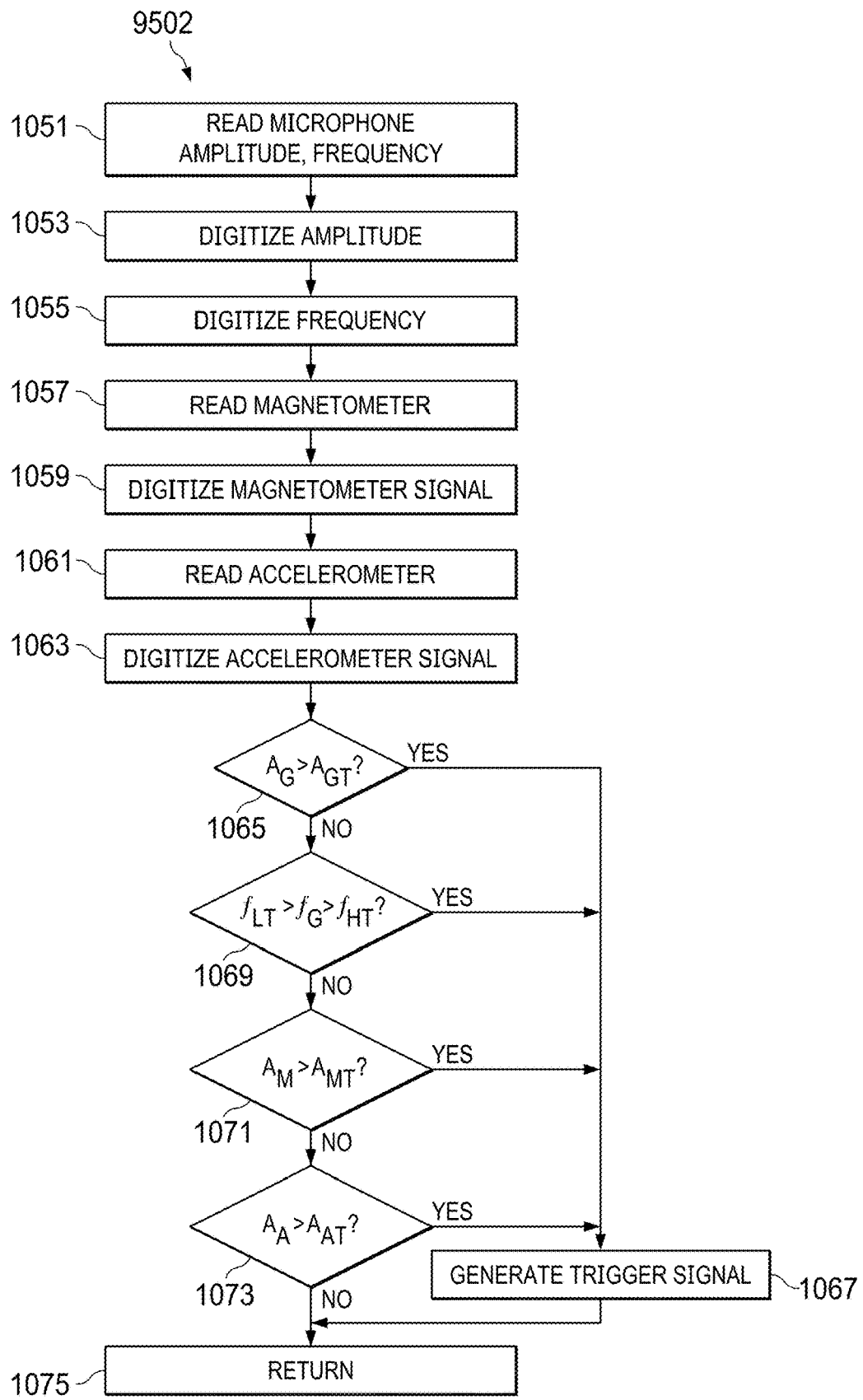
FIG. 10H is a flowchart of a preferred method of detecting a trigger event.

Referring to FIG. 10H the step of detecting a trigger event of step 9502 will be further described.

At step 1051, the node processor reads the magnitude and frequency from the geophone. At step 1053, the node processor digitizes the geophone amplitude. At step 1055, the node processor digitizes the frequency. At step 1057, the node processor reads the magnetometer signal. At step 1059, the node processor digitizes the magnetometer signal. At step 1061, the node processor reads the accelerometer signal. At step 1063, the node processor digitizes the accelerometer signal.

At step 1065, the node processor determines whether or not the geophone amplitude "$A_g$" is greater than a threshold value for geophone amplitude "$A_{gt}$". If so, the node processor moves to step 1067. If not, the node processor moves to step 1069.

At step 1069, the node processor determines whether or not the digitized frequency "$f_g$" is between a low frequency threshold "$f_{lt}$" and a high frequency threshold $f_{ht}$". If so, the node processor moves to step 1067. If not, the node processor moves to step 1071.

At step 1071, the node processor determines whether or not the magnitude of the magnetometer amplitude "$A_m$" is greater than a threshold for the magnetometer amplitude "$A_{mt}$". If so, the node processor moves to step 1067. If not, the processor moves to step 1073.

At step 1073, the node processor determines whether the magnitude of the accelerometer amplitude "$A_a$" is greater than a threshold for the accelerometer magnitude "$A_{at}$". If so, the node processor moves to step 1067. If not, the node processor moves to step 1075.

At step 1067, the node processor generates a trigger signal and moves to step 1075.

At step 1075, the node processor returns to the main routine.

Referring then to FIG. 11, a prophetic exemplary report as generated at step 9610 will be further described.

Exemplary report 1100 includes array map 1102.

Array map 1102 includes a plan view of node positions geographically arranged on x, y axis 1104. Node positions are shown in the x, y plane at their relative spacing distances. In this case, node positions $N_{0,0}$, $N_{7,7}$, are depicted in a rectangular grid of equidistant spacing, "a".

Maximum amplitude positions for time indexes $t_0$, $t_1$, $t_2$, $t_3$, $t_4$, $t_5$, $t_6$ and $t_7$ are shown at node positions, $N_{0,1}$, $N_{1,4}$, $N_{2,1}$, $N_{4,4}$, $N_{4,6}$, $N_{5,41}$, $N_{6,6}$, and $N_{7,7}$, respectively. The maximum amplitude positions can indicate the maximum amplitudes from any one of the sensor types and/or all of the sensor types available. Path vector 1105 is displayed as a straight line graph, proceeding, generally, from node $N_{0,1}$ to node $N_{7,7}$. Path vectors for each sensor type may be similarly displayed. Velocity profile includes instantaneous velocities 1106 at time indexes to through $t_7$, instantaneous accelerations 1108 at time indexes to through $t_7$, average velocity 1110, and average acceleration 1112.

Figure 12A:
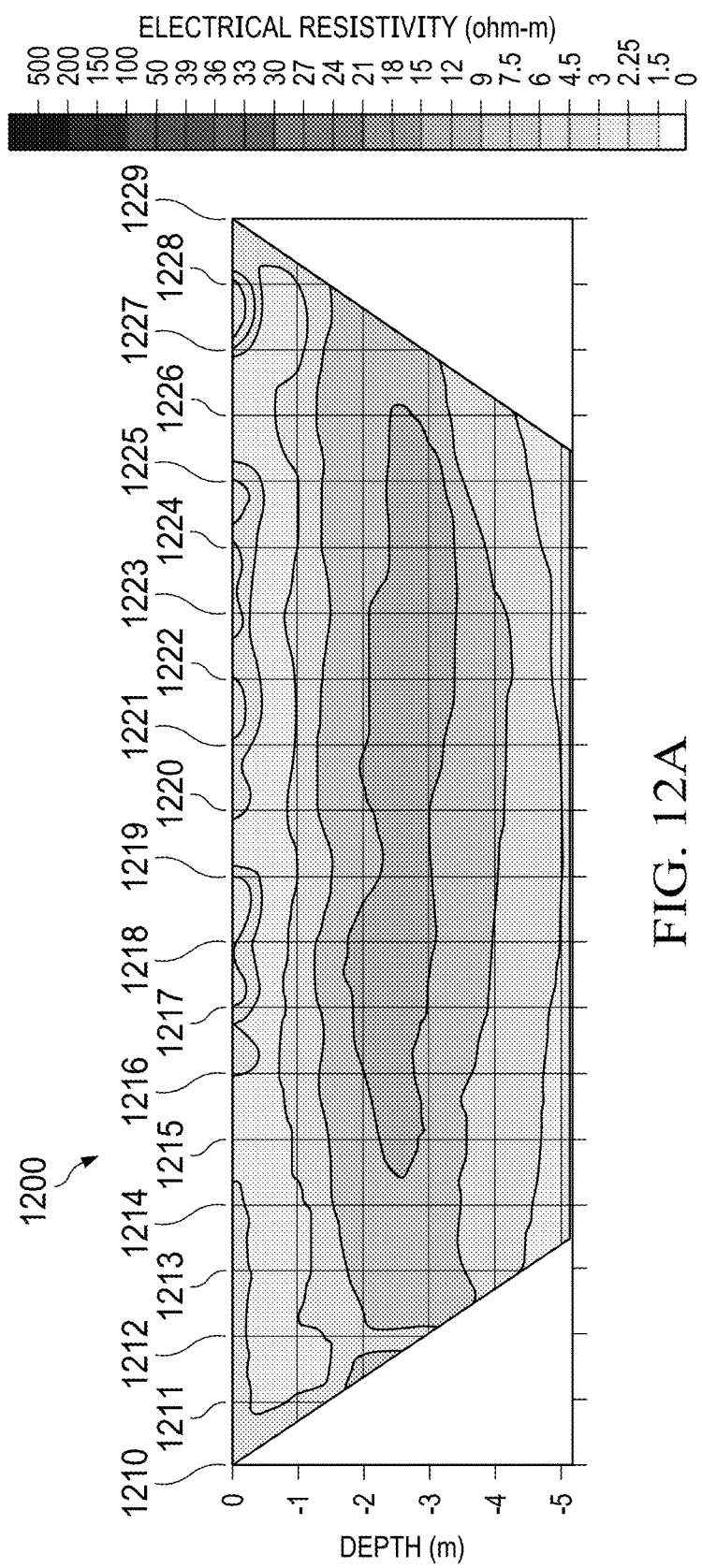
FIGS. 12A and 12B are exemplary ERT survey map reports.

Referring then to FIG. 12A, prophetic baseline resistivity map 1200 will be described. Resistivity map 1200 is a graphical representation of typical ERT survey data. The topology of the ERT system in this example includes twenty nodes, in a dipole-dipole topology, at positions 1210, 1211, 1212, 1213, 1214, 1215, 1216, 1217, 1218, 1219, 1220, 1221, 1222, 1223, 1224, 1225, 1226, 1227, 1228 and 1229. Each of the nodes is placed at internode spacing about 1 meter. Equipotential shades indicate electrical resistivity profiles ranging from about 1.5 Ohms per meter at a depth to about 10 Ohms per meter at a depth. Importantly, no anomalies, such as a void, tunnel, or liquid appear in the resistivity map.

Figure 12B:
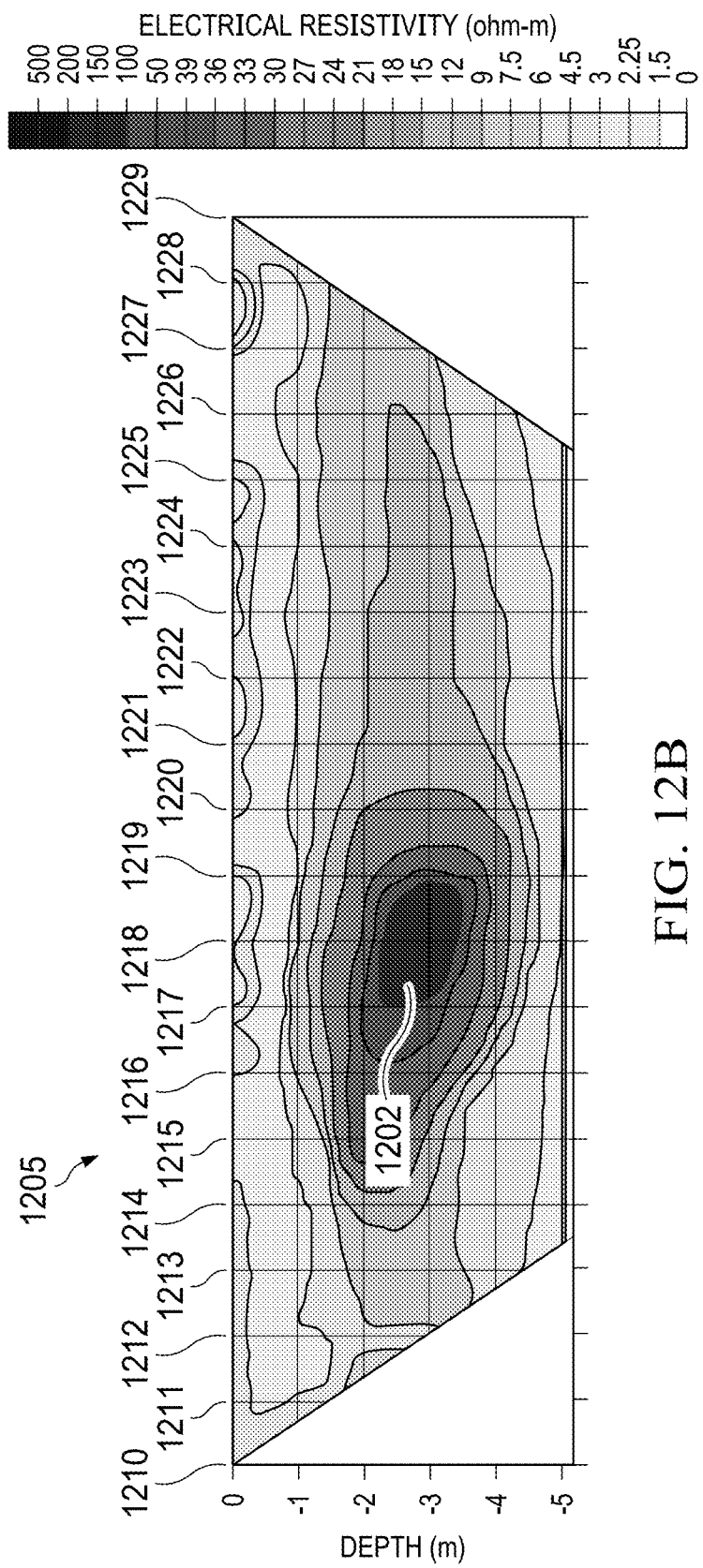

Referring then to FIG. 12B, prophetic current resistivity map 1205 will be described. Current resistivity map 1205 is a graphical representation of an ERT survey taken in the same location as baseline resistivity map 1200, after the occurrence of a trigger event. Importantly, the current resistivity map shows the appearance of anomaly 1202 with high resistivity readings at a depth between 2 and 4 meters between electrode positions 1215 and 1220. The high resistivity readings indicate a void, such as a tunnel, which has appeared between the time that the resistivity data for baseline resistivity map 1200 was taken and the time that resistivity data for current resistivity map 1205 was taken.

The invention claimed is:

1. A seismically triggered intrusion detection system comprising:
   a controller having a controller processor and a controller memory;
   an electrical resistivity tomography node array operatively connected to the controller;
   the electrical resistivity tomography node array further comprising:
   a master processor, having a master processor memory;
   a plurality of node processors, having a plurality of node processor memories;
   a unidirectional upstream communication channel, connecting the master processor and each node processor of the plurality of node processors;
   a unidirectional downstream communication channel, connecting the master processor and each node processor of the plurality of node processors;
   a dedicated synchronization channel, connecting the master processor and each node processor of the plurality of node processors;
   a set of seismic sensors operatively connected to the plurality of node processors; and
   a set of instructions, stored in the controller memory, the master processor memory and the plurality of node processor memories, that when executed cause the seismically triggered intrusion detection system to:
      conduct a self-enumeration process at each node processor of the plurality of node processors, using the unidirectional upstream communication channel;
      format the plurality of node processors, by the master processor, using the unidirectional upstream communication channel;
      detect a trigger event;
      conduct a sensor test, with the set of seismic sensors in response to the trigger event;
      conduct an electrical resistivity tomography test with the electrical resistivity tomography node array in response to the trigger event including the steps of:
         acquiring a set of geophysical data, by the plurality of node processors, controlled by a set of test shot signals, from the master processor, using the dedicated synchronization channel; and
         reporting the set of geophysical data, from the plurality of node processors, to the master processor, using the unidirectional downstream communication channel;
      conduct a sensor comparison analysis;
      conduct an electrical resistivity tomography comparison analysis; and
      generate a report based on one of the sensor comparison analysis and the electrical resistivity tomography comparison analysis.

2. The seismically triggered intrusion detection system of claim 1 wherein the step of conducting the sensor comparison analysis further comprises:
   determining a path vector map.

3. The seismically triggered intrusion detection system of claim 2 wherein the step of conducting the sensor comparison analysis further comprises determining one of a group of:
   a velocity profile;
   an average velocity;
   an acceleration profile; and,
   an average acceleration.

4. The seismically triggered intrusion detection system of claim 2 wherein the step of determining the path vector map further comprises:
   obtaining a set of sensor amplitudes from the sensor test;
   identifying a set of maximum amplitudes, from the set of sensor amplitudes, associated with a set of electrical resistivity tomography node positions, indexed by a set of time increments; and,
   determining the path vector map from the set of maximum amplitudes.

5. The seismically triggered intrusion detection system of claim 4 wherein the step of determining the path vector map further comprises:
applying a linear regression analysis to the set of electrical resistivity tomography node positions.

6. The seismically triggered intrusion detection system of claim 4 wherein the step of determining further comprises:
obtaining a straight line graph through the set of electrical resistivity tomography node positions.

7. The seismically triggered intrusion detection system of claim 6 further comprising one of a group of:
obtaining a velocity profile from the straight line graph, and obtaining an acceleration profile from the velocity profile.

8. The seismically triggered intrusion detection system of claim 4 wherein the set of instructions further comprises instructions, that when executed, cause the seismically triggered intrusion detection system to:
enter a sleep mode; and,
exit the sleep mode upon detecting the trigger event.

9. The seismically triggered intrusion detection system of claim 1 wherein the step of conducting the electrical resistivity tomography comparison analysis further comprises:
conducting a baseline electrical resistivity tomography survey with the electrical resistivity tomography node array;
conducting a current electrical resistivity tomography survey with the electrical resistivity tomography node array; and,
comparing the current electrical resistivity tomography survey to the baseline electrical resistivity tomography survey.

10. The seismically triggered intrusion detection system of claim 9 wherein the step of comparing further comprises:
accumulating a set of baseline resistivity values, from the baseline electrical resistivity tomography survey, into a baseline sum;
accumulating a set of current resistivity values, from the current electrical resistivity tomography survey, into a current sum;
calculating a difference between the baseline sum and the current sum; and
returning a signal if the difference is above a threshold value.

11. The seismically triggered intrusion detection system of claim 10 wherein the set of instructions further comprises instructions, that when executed, cause the seismically triggered intrusion detection system to:
generate a first resistivity map from the baseline electrical resistivity tomography survey; and
generate a second resistivity map from the current electrical resistivity tomography survey.

12. The seismically triggered intrusion detection system of claim 1 wherein the sensor test further comprises one of a group of reading a geophone amplitude, reading a geophone frequency, reading an accelerometer amplitude and reading a magnetometer amplitude.

13. The seismically triggered intrusion detection system of claim 12 wherein the set of instructions further comprises instructions that when executed cause the seismically triggered intrusion detection system to execute one of the group of:
comparing the geophone amplitude to a geophone threshold amplitude;
comparing the accelerometer amplitude to an accelerometer amplitude threshold; and,
comparing the magnetometer amplitude to a magnetometer amplitude threshold.

14. The seismically triggered intrusion detection system of claim 1 wherein the set of seismic sensors includes one of a group of a geophone, an accelerometer and a magnetometer.

15. The seismically triggered intrusion detection system of claim 1 wherein the trigger event further comprises a first amplitude signal exceeding a second amplitude signal.

16. The seismically triggered intrusion detection system of claim 1 wherein the trigger event further comprises a manual trigger signal.

17. The seismically triggered intrusion detection system of claim 1 wherein the electrical resistivity tomography node array further comprises one of a group of a linear array, a dual direction array, a quadrilateral node array, a star node array, a ring node array and a grid node array.

18. The seismically triggered intrusion detection system of claim 1 wherein the electrical resistivity tomography node array further comprises one of a group of a pole-dipole configuration, a dipole-dipole configuration, a Schlumberger configuration and a Wenner configuration.

19. A method of seismically triggered intrusion detection comprising:
providing a controller, having a controller processor and a controller memory;
providing an electrical resistivity tomography node array operatively connected to the controller;
the electrical resistivity tomography node array further comprising:
a master processor, having a master processor memory;
a plurality of node processors, having a plurality of node processor memories;
a unidirectional upstream communication channel, connecting the master processor and each node processor of the plurality of node processors;
a unidirectional downstream communication channel, connecting the master processor and each node processor of the plurality of node processors;
a dedicated synchronization channel, connecting the master processor and each node processor of the plurality of node processors;
providing a set of seismic sensors operatively connected to the plurality of node processors; and
providing a set of instructions, stored in the controller memory, the master processor memory and the plurality of node processor memories that when executed cause the controller processor, the master processor, and the plurality of node processors to:
conduct a self-enumeration process at each node processor of the plurality of node processors, using the unidirectional upstream communication channel;
format the plurality of node processors, by the master processor, using the unidirectional upstream communication channel;
receive a trigger signal;
conduct a sensor test, with the electrical resistivity tomography node array in response to the trigger signal;
conduct an electrical resistivity tomography test, with the electrical resistivity tomography node array, in response to the trigger signal including the steps of:
acquiring a set of geophysical data, by the plurality of node processors, controlled by a set of test shot signals, from the master processor, using the dedicated synchronization channel;

reporting the set of geophysical data, from the plurality of node processors, to the master processor, using the unidirectional downstream communication channel;
conduct a sensor comparison analysis;
conduct an electrical resistivity tomography comparison analysis; and;
generate a report based on one of the sensor comparison analysis and the electrical resistivity tomography comparison analysis.

20. The method of claim 19 wherein the step of conducting the sensor comparison analysis further comprises:
determining a path vector map.

21. The method of claim 20 wherein the step of conducting the sensor comparison analysis further comprises determining one of a group of:
a velocity profile;
an average velocity;
an acceleration profile; and,
an average acceleration.

22. The method of claim 20 wherein the step of determining the path vector map further comprises:
obtaining a set of sensor amplitudes from the sensor test;
identifying a set of maximum amplitudes, from the set of sensor amplitudes, associated with a set of electrical resistivity tomography node positions, indexed by a set of time increments; and,
determining the path vector map from the set of maximum amplitudes.

23. The method of claim 22 wherein the step of determining the path vector map further comprises:
obtaining a straight line graph through the set of electrical resistivity tomography node positions.

24. The method of claim 23 further comprising one of a group of:
obtaining a velocity profile from the straight line graph, and obtaining an acceleration profile from the velocity profile.

25. The method of claim 24 wherein the step of providing the set of instructions further comprises providing the instructions of:
generating a first resistivity map from a baseline electrical resistivity tomography survey; and;
generating a second resistivity map from a current electrical resistivity tomography survey.

26. The method of claim 19 wherein the sensor test further comprises providing one of a group of reading a geophone amplitude, reading a geophone frequency, reading an accelerometer amplitude and reading a magnetometer amplitude.

27. The method of claim 26 wherein the step of providing the set of instructions further comprises providing the instructions of:
comparing the geophone amplitude to a geophone threshold amplitude;
comparing the accelerometer amplitude to an accelerometer amplitude threshold; and,
comparing the magnetometer amplitude to a magnetometer amplitude threshold.

28. The method of claim 19 wherein the step of providing the set of seismic sensors further includes providing one of a group of a geophone, an accelerometer and a magnetometer.

29. The method of claim 19 wherein the step of providing the electrical resistivity tomography node array further comprises providing one of a group of a linear array, a dual direction array, a quad direction array, a star array, a ring node array and a grid node array.

30. The method of claim 19 wherein the step of providing the electrical resistivity tomography node array further comprises providing one of a group of a pole-dipole configuration, a dipole-dipole configuration, a Schlumberger configuration and a Wenner configuration.

* * * * *